United States Patent [19]

Kroenke

[11] Patent Number: 5,819,086
[45] Date of Patent: Oct. 6, 1998

[54] COMPUTER SYSTEM FOR CREATING SEMANTIC OBJECT MODELS FROM EXISTING RELATIONAL DATABASE SCHEMAS

[75] Inventor: David Kroenke, Seattle, Wash.

[73] Assignee: Wall Data Incorporated, Kirkland, Wash.

[21] Appl. No.: 478,377

[22] Filed: Jun. 7, 1995

[51] Int. Cl.$^6$ .................................................... G06F 17/30
[52] U.S. Cl. .......................... 395/613; 395/703; 395/340; 364/280.4; 364/282.1
[58] Field of Search .................................. 395/700, 157, 395/703, 613, 282.1, 280.4

[56] References Cited

U.S. PATENT DOCUMENTS

| | | |
|---|---|---|
| 4,930,071 | 5/1990 | Tou et al. . |
| 5,195,178 | 3/1993 | Krieger et al. ............................ 395/157 |
| 5,212,787 | 5/1993 | Baker et al. . |
| 5,263,167 | 11/1993 | Conner, Jr. et al. . |
| 5,278,946 | 1/1994 | Shimada et al. . |
| 5,295,256 | 3/1994 | Bapat . |
| 5,307,499 | 4/1994 | Yin . |
| 5,418,950 | 5/1995 | Li et al. . |
| 5,499,371 | 3/1996 | Henninger et al. ....................... 395/700 |
| 5,548,749 | 8/1996 | Kroenke et al. .......................... 395/613 |

FOREIGN PATENT DOCUMENTS

| | | |
|---|---|---|
| 0 560 543 A2 | 9/1993 | European Pat. Off. . |
| 2 253 500 | 9/1992 | United Kingdom . |
| 2253500 | 9/1992 | United Kingdom .............. G06F 9/44 |
| WOA95 03586 | 2/1995 | WIPO . |
| WOA95/3586 | 2/1995 | WIPO .............................. G06F 15/40 |
| WOA95 12172 | 5/1995 | WIPO . |
| WOA95/ 12172 | 5/1995 | WIPO .............................. G06F 17/30 |

OTHER PUBLICATIONS

PCT International Search Report, mailed Sep. 17, 1996.
D. R. McClanahan, "Database Design: Relational Rules," *DBMS*, vol. 4, No. 12, Nov. 1991, pp. 54–58.
D. R. McClanahan, "Conceptual Design," *DBMS*, vol. 5, No. 1, Jan. 1992, p. 66(5).
"Novell Preps Marketing Blitz for AppWare 1.0; Distributed AppWare Next", Windows Watcher, v4, n5, p. 7(1), May 1994.
Emigh, Jacqueline "UK—Wall Data Announces Salsa Buisness Division", Newbytes, pNEWSO624001, Jun. 1994.
Rymer, John "Wall Data Salsa", Distributed Computing Monitor, v9, n9, p. S2(2), Sep. 1994.
Johnson, Stuart J. "Salsa Serves Up Database Objects", ComputerWorld, p. 43, Jan. 22, 1996.
Kalman, David "Waxing Semantic", DBMS, v7, n10, p60(6), Sep. 1994.

(List continued on next page.)

*Primary Examiner*—Thomas G. Black
*Assistant Examiner*—Charles L. Rones
*Attorney, Agent, or Firm*—Christensen O'Connor Johnson & Kindness PLLC

[57] ABSTRACT

A computer system for creating a semantic object model from an existing relational database schema. The computer system analyzes the catalog information of the relational database schema and creates a semantic object for each table defined in the catalog. For each column defined within a table, a simple value attribute is added to the semantic object created for the table. The system then analyzes the relationship information stored in the catalog to create object link attributes that define relationships between two or more semantic object as well as to create multivalued group attributes and multivalued, simple value attributes. If the database catalog does not include the relational information, the user is prompted to indicate related semantic objects.

20 Claims, 22 Drawing Sheets

OTHER PUBLICATIONS

Bourdeau et al. "A Formal Semantics for Object Model Diagrams", *IEEE Transactions on Software Engineering*, v21, n10, pp. 799–821, Oct. 1995.

Penrod, Paul "SOM: Working the Way You Think", Windows Sources, v2, n11, p. 38(1), Nov. 1994.

Kroenke, David M., "Business Modeling With Semantic Objects", Data Based Advisor, p. 1–4, Dec. 1994.

Codd, E.F., "Extending the Database Relationship Model to Capture More Meaning," *ACM Transactions on Database Systems*, vol. 4, No. 4, Dec. 1979, pp. 397–434.

G. Decorte et al., "An Object–Oriented Model for Capturing Data Semantics," *IEEE Computer Society Press*, Feb. 1992, pp. 126–135.

M. Hammer and D. McLeod, "Database Description with SDM: A Semantic Database Model," *ACM Transaction On Database Systems*, vol. 6, No. 3, Sep. 1981, pp. 351–386.

D. M. Kroenke, "Developing Object–Oriented Database Applications on Microcomputers," *The Second International Conference on Computers and Appplications*, The Computer Society of the IEEE, Jun. 1987, pp. 70–77.

D. M. Kroenke, *Database Processing: Fundamentals, Design, Implementation, 4th Ed.*, Macmillan Publishing Company, 1992, Chapters 5 and 7, pp. 123–167 and pp. 205–252.

D. Keim et al., "Object–Oriented Querying of Existing Relational Database," *Database and Expert Systems Application*, 4th International Conference, Sep. 6–8, 1993, pp. 326–336.

F. Leymann, "UDH: A Universal Relation System," *Data & Knowledge Engineering* vol. 5, (1990) pp. 21–38.

"Visual Representation of Database Query Definition," *IBM Technical Disclosure Bulletin*, vol. 33, No. 9, Feb. 1991, pp. 238–242.

International Search Report dated Jan. 31, 1995.

S. Dewitz and M. Olson, "Semantic Object Modeling with SALSA," Mitchell McGraw–Hill Publishing Company, 1994.

Blaha et al., "Relational Database Design Using An Object–Oriented Methodology," *Communications of the ACM*, vol. 31, No. 4 Apr. 1988, pp. 414–427.

Lejter et al., "Support for Maintainting Object–Oriented Programs," *IEEE Transactions on Software Engineering*, vol. 18, Dec. 1992, pp. 1045–1052.

FIG. 1a.
(PRIOR ART)

| CUSTOMER | |
|---|---|
| NAME | PHONE |
| | |
| | |
| | |

PRIMARY KEY = NAME

FIG. 1b.
(PRIOR ART)

| ARTIST | |
|---|---|
| NAME | BIRTHYEAR |
| | |
| | |
| | |

PRIMARY KEY = NAME

FIG. 1c.
(PRIOR ART)

| MEDIA | |
|---|---|
| NAME | MEDIUM |
| | |
| | |
| | |

PRIMARY KEY = (NAME, MEDIUM)
NAME IS FOREIGN KEY TO NAME OF ARTIST

FIG. 1d.
(PRIOR ART)

| PURCHASE | | | |
|---|---|---|---|
| NAME_1 | DATE | PRICE | NAME_2 |
| | | | |
| | | | |
| | | | |

PRIMARY KEY = (NAME_1, DATE)
NAME_1 IS FOREIGN KEY TO NAME OF CUSTOMER
NAME_2 IS FOREIGN KEY TO NAME OF PAINTING

FIG. 1e.
(PRIOR ART)

| C_A | |
|---|---|
| NAME_1 | NAME_2 |
| | |
| | |

PRIMARY KEY = (NAME_1, NAME_2)
NAME_1 IS FOREIGN KEY TO NAME OF CUSTOMER
NAME_2 IS FOREIGN KEY TO NAME OF ARTIST

FIG. 1f.
(PRIOR ART)

| PAINTING | | |
|---|---|---|
| NAME | DATE PAINTED | NAME_1 |
| | | |
| | | |
| | | |

PRIMARY KEY = NAME
NAME_1 IS FOREIGN KEY TO NAME OF ARTIST

COMPUTER SYSTEM FOR CREATING SEMANTIC OBJECT MODELS FROM EXISTING RELATIONAL DATABASE SCHEMAS

FIELD OF THE INVENTION

The present invention relates to computer systems in general, and in particular, to computer systems that store and retrieve information in a relational database.

BACKGROUND OF THE INVENTION

At some point in time, most computer users have the need to store and retrieve some sort of information. Typically, information is stored on a computer system using any one of numerous commercially-available database programs. These programs allow a user to define the types of information to be stored in the database, as well as provide forms for users who will enter the data into the database and print reports for people wishing to retrieve previously-stored information.

One of the most popular types of databases are relational databases. In a relational database, data are stored in rows of a two-dimensional table having one or more columns that define the types of data that are stored. Traditionally, it has been difficult for a novice or unsophisticated users to create the relational database tables (also referred to as a database schema) in a way that accurately mirrors the user's idea of how the data should be stored in the database.

A new approach for allowing users to create relational database schemas is a database modeling system called SALSA™ being developed by Wall Data Incorporated of Seattle, Wash. This system allows users to create a model of the data to be stored in the database. The model consists of one or more semantic objects that represent a complete item, such as a person, an order, a company, or anything else that a user might think of in terms of being a unique entity that will be stored in the database. Each semantic object includes one or more attributes that store identifying information about the semantic object, and may contain object link attributes that define relationships between two or more semantic objects. Once the user has completed the semantic object model, the SALSA database modeling system analyzes the semantic object model and creates a corresponding relational database schema that stores data in the computer. The details of the SALSA database modeling system are set forth in commonly assigned, co-pending U.S. patent application, Ser. No. 08/145,997, filed Oct. 29, 1993 and now U.S. Pat. No. 5,548,749, which is hereby incorporated by reference.

The benefit of the SALSA database modeling system is that it allows users to easily define data to be stored in a database, as well as relationships between the data, without requiring the user to know anything about the underlying database management system that controls how data is stored in the memory and/or hard disk of the computer. Users can simply manipulate the building blocks of the semantic object model and do not have to concern themselves with relational database concepts such as tables, columns, primary and foreign keys, intersection tables and the like.

While the database modeling system described in the '997 patent application represents a significant improvement in the art of database modeling, no mechanism is provided for automatically producing a semantic object model of an existing database schema that may have been created with a traditional relational database program. Therefore, there is a need for a system that can analyze an existing relational database in order to create a corresponding semantic object model.

SUMMARY OF THE INVENTION

The present invention is a computer system programmed to automatically create a semantic object model from an existing relational database schema. The schema is analyzed by reading the catalog information of the relational database and creating a corresponding semantic object for each table defined in the database. Each column defined for a table of the database is used to create a corresponding simple value attribute within the corresponding semantic object. If the database catalog includes relationship information, the catalog is then analyzed to determine whether a table includes any foreign keys. The foreign key information is used to create corresponding object link attributes that define relationships between two or more semantic objects as well as to create multivalued group attributes or multivalued, simple value attributes within a semantic object.

If the database catalog does not provide relational information, the user is prompted to indicate tables in the database that are related as well as to indicate which columns in tables represent foreign keys. This information is used then to modify the semantic object model to reflect the relationships and multivalued attributes within the semantic object model.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a diagrammatic representation of a typical relational database schema;

DETAILED DESCRIPTION OF THE PREFERRED EMBODIMENT

Figure 2A:
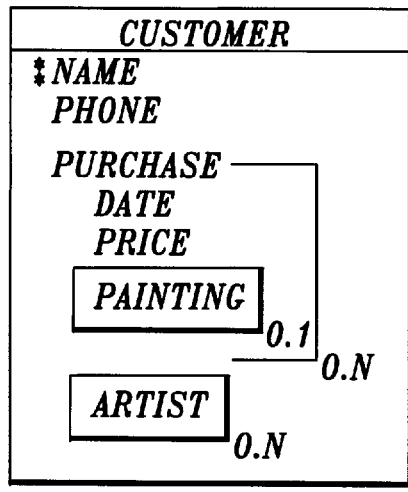
FIG. 2 is a diagrammatic representation of a semantic object model created by the present invention to correspond to the database schema shown in FIG. 1.

As indicated above, the present invention is a system for creating a semantic object model to correspond to an existing relational database schema that resides within the memory of a computer system. Once completed, the semantic object model allows a user to easily update or modify the database schema by manipulating the components of the semantic object model. In this way, users can manipulate the relational database without having to understand the relational database management system or query language normally used to edit the schema.

FIG. 1 shows a representation of a relational database schema. This schema stores database information in a computer system operated by the owner of an art gallery. The schema includes six relational tables. A table 5 stores information regarding a customer of the gallery. The table 5 includes two columns labeled "Name" and "Phone" that store the name of the customer and the telephone number of the customer. As will be appreciated by those skilled in the art of relational databases, the database management system maintains a record to indicate that the primary key of the table 5 is the Name column. A primary key of the table identifies a unique entry in the table, i.e., a particular customer of the gallery.

A table 7 stores information regarding an artist who is represented at the gallery. The table 7 includes two columns labeled "Name" and "Birthyear" that store the name of the artist and the year the artist was born. The primary key of the table 7 is defined as an entry in the Name column.

A table 9 stores information regarding the various media with which an artist may work. The table includes two columns. The first column is labeled "Name" and serves to link an entry in the second column to a particular artist in the relational table 7. The second column is labeled "Medium" and stores text that identifies a particular artistic media such as oil, watercolors, glass, ceramic, etc. The primary key of the table 7 is defined as the combination of the entries in the Name and Medium columns.

A table 11 stores information regarding a particular painting that is on display in the gallery. The table includes three columns labeled "Name," "Date Painted" and "Name__1" that store a name of a painting, the date on which the painting was completed and a foreign key to a column of the table 7 in order to link a painting with its artist. The primary key of the table 11 is an entry in the Name column.

A table 13 stores information regarding purchases made by a customer of the art gallery. The table includes four columns labeled: "Name__1," "Date," "Price," and "Name__2." The column labeled Name__1 holds the name of a customer, while the column labeled Date stores the date on which the painting was purchased. The column labeled Price stores the price paid for the painting. Finally, the column labeled Name__2 holds the name of a painting. Name__1 is a foreign key to the table 5 and Name__2 is a foreign key to the table 11.

The last table in the database is a table 15 that relates an entry in the table 5 to an entry in the table 7. The table 15 includes two columns: "Name__1" and "Name__2." Each column stores a foreign key to the table 5 and table 7 respectively. The table 15 allows the database management system to link customers of the gallery to artists on display at the gallery. The primary key of the table 15 is selected as the combination of entries in the two columns, Name__1 and Name__2.

The database schema represented in FIG. 1 is typical of a relational database schema created with traditional relational database programs. Computer users who are unfamiliar with relational database programming may find it difficult to create the schema without the help of expert database programmers. Creating the schema shown in FIG. 1 requires knowledge of such database concepts as tables, primary keys, foreign keys and intersection tables.

Figure 2B:
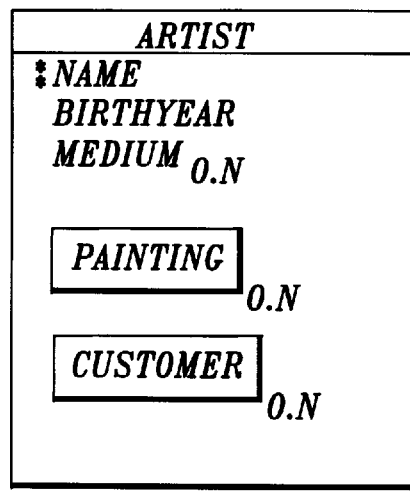
Figure 2C:
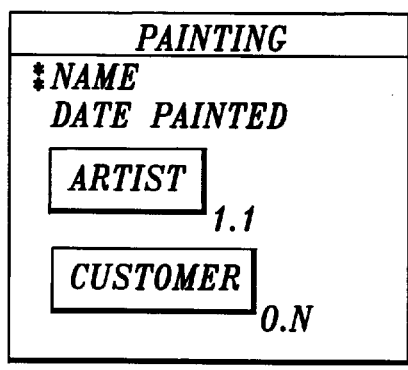

As indicated above, the SALSA database modeling system allows users to create database schemas without knowing relational database concepts. FIG. 2 shows a semantic object model 20 that corresponds to the relational database schema shown in FIG. 1. The semantic object model is comprised of three semantic objects. A semantic object 22 represents a customer of the gallery. A semantic object 30 represents an artist whose works are displayed at the gallery and a semantic object 40 represents paintings on display at the gallery.

Each semantic object in the object model 20 has a number of attributes. The attributes represent information concerning each semantic object that is stored in the database. For example, the semantic object 22 has an attribute labeled "Name" representing the name of the customer, an attribute labeled "Phone" represents the phone number of the customer that is stored in the database. Additionally, the customer includes a group attribute labeled "Purchase" that represents a sale made at the gallery. The group attribute, Purchase, comprises three simple value attributes that represent the date on which a purchase was made, the price of the painting bought and an object link attribute that relates the purchase of a particular painting represented by an instance of the semantic object 40. Attributes that uniquely define an instance of the semantic object are shown with two stars to the left of the attribute name. Object link attributes that define relationships between two semantic objects in the semantic object model are enclosed in a box to differentiate them from other, simple value or group objects in the semantic object.

As set forth in the '997 patent application, some attributes have their minimum and maximum cardinality displayed as subscripts at the lower right-hand corner of the attribute name. The minimum cardinality refers to the minimum number of instances of the attribute that the semantic object must have to be valid, while the maximum cardinality refers to the maximum number of instances the attribute may have to be valid. For example, the group attribute labeled "Purchase" in the semantic object 22 has a minimum cardinality of zero, indicating that a customer of the gallery may not have made a purchase. Similarly, the maximum cardinality of the group purchase is N, indicating that a customer may have made more than one purchase from a gallery. The cardinality numbers also apply to object link attributes. For example, the semantic object 22 includes an object link attribute labeled "Artist" that links a customer in the database to an artist to keep track of artists in whom a customer is interested. The object link labeled "Artist" is multivalued, i.e., it has a maximum cardinality of N, thereby indicating that the customer may be interested in many artists.

The semantic object 30 represents an artist whose work is displayed at the gallery. The Artist semantic object includes two simple value attributes, labeled "Name" and "Birthyear," that represent biographical information stored about an artist. The attribute, Name, is indicated as being unique to signify that no two artists in the database have the same name. Additionally, the semantic object 30 includes a multivalued, simple value attribute, labeled "Medium," which represents various media in which the artist may work. Finally, the semantic object 30 also includes two multivalued object link attributes labeled "Painting" and "Customer" that link an artist to a painting and an artist to a customer.

The last semantic object 40 in the semantic object model represents a painting on display in the gallery. The semantic object 40 includes two simple value attributes, labeled "Name" and "Date_Painted." The name of the painting is indicated as being unique among painting names stored in the database. The semantic object 40 also includes two object link attributes. A first object link attribute is labeled "Artist" and represents a relationship between a painting and an artist. The cardinality of this relationship is 1.1, indicating that a painting must have at least one artist and can have at most one artist. The object link attribute labeled "Customer" represents the relationship between a painting and a customer. This attribute has a cardinality of 0.N, indicating that no customers may be interested in a painting, or there may be many customers interested in a painting.

As indicated above, the benefit of the semantic object model 20 shown in FIG. 2, as opposed to conventional database programs, is that a user can update or modify the database by the addition or deletion of semantic objects, or the addition or deletion of attributes within a semantic object. By manipulating the components of the semantic object model, a user is able to create or modify a relational database in a way that mirrors how the user thinks about the data to be stored in the database without having to understand the relational database concepts required to create the schema shown in FIG. 1.

As indicated above, the SALSA database modeling system being developed by Wall Data Incorporated allows a user to create a semantic object model and analyzes the model in order to create a corresponding relational database schema. However, many computer users will have already created a database schema using currently available relational database programs, such as Microsoft Access®, or Borland Paradox®. In order to allow unsophisticated users to easily update or modify these databases, the present invention creates a corresponding semantic object model from an existing relational database schema.

Figure 3:
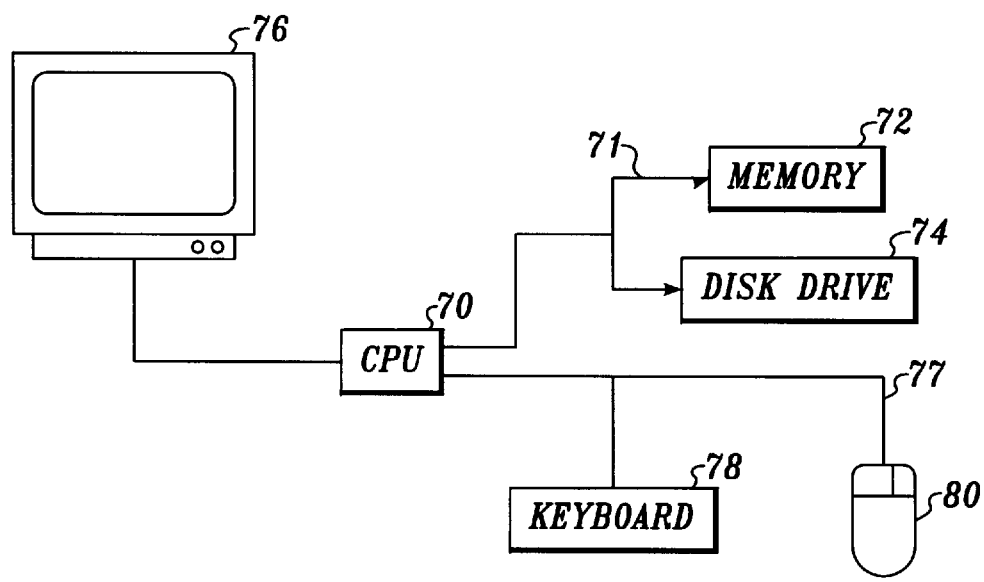
FIG. 3 is a block diagram of a computer system according to the present invention that is programmed to create a semantic object model from an existing relational database schema.

Turning now to FIG. 3, a computer system for implementing the present invention is shown. The computer system generally comprises a central processing unit 70, having an internal memory 72 and a permanent storage means, such as a disk drive 74. Commands are entered into the CPU using a keyboard 78 and pointing device, such as a mouse 80. The CPU generates a graphical user interface that is shown on a display screen or monitor 76.

Residing within the memory 72 is a set of programmed instructions that direct the CPU to analyze an existing relational database schema to create a corresponding object model that is shown to a user on the display 76. The programmed instructions may be permanently stored on a read-only memory, or may be received by the computer system from a floppy disk CD-ROM or in a modem connected to the CPU. In the presently preferred embodiment of the invention, the CPU 70 is programmed in an object oriented language such as C++. However, those skilled in the art will recognize that other programming languages may be used if desired.

The following flow charts describe the operation of the computer program implemented by the central processing unit in order to produce a semantic object model from an existing relational database schema. As is set forth in the '997 patent application, the computer system uses a series of C++ classes in order to store a representation of a semantic object model. For ease of reference, the data members of these classes that are important to the understanding of the invention are reprinted here. The procedures or methods of each class that create the semantic object model are not shown, but the operation of the procedures is discussed below. Those skilled in the art of computer programming will be able to create the required methods from the description of the present invention that follows.

| Data Member | Data Type |
| --- | --- |
| Class Album | |
| Name | Text |
| Creation date | Date |
| Created by | Text |
| Contents | Unordered list of pointers |
| Class Semantic Object | |
| ID | Integer |
| Name | TEXT |
| Caption | TEXT |
| Description | TEXT |
| Contents | Ordered list of pointers |
| Class Simple Value Profile | |
| ID | Integer |
| Name | TEXT |
| Caption | TEXT |
| Description | TEXT |
| ID Status | (Unique, non-unique, none) |
| Value Type | Any DBMS Data Type |
| Length | Integer |
| Format | TEXT |
| Initial Value | TEXT |
| MinCardinality | Integer |
| MaxCardinality | Integer |
| Derived Attributes | List of pointers |
| Referencing Profiles | List of pointers |
| Class Object Link Profile | |
| ID | Integer |
| Name | TEXT |
| Caption | TEXT |
| Description | TEXT |
| ID Status | (Unique, non-unique, none) |
| MinCardinality | Integer |
| MaxCardinality | Integer |
| Base Semantic Object | Pointer |
| Derived Attributes | List of pointers |
| Referencing Profiles | List of pointers |
| Class Simple Value Attribute | |
| ID | Integer |
| Name | TEXT |
| Description | TEXT |

| Data Member | Data Type |
|---|---|
| Caption | TEXT |
| ID Status | (Unique, non-unique, none) |
| Value Type | Any DBMS Data Type |
| Length | Integer |
| Format | TEXT |
| Initial Value | TEXT |
| MinCardinality | Integer |
| MaxCardinality | Integer |
| Container Pointer | Pointer |
| Base Profile | Pointer |
| Class Group Profile | |
| ID | Integer |
| Name | TEXT |
| Caption | TEXT |
| Description | TEXT |
| ID Status | (Unique, non-unique, none) |
| MinCardinality | Integer |
| MaxCardinality | Integer |
| MinCount | Integer |
| MaxCount | Integer |
| Format | TEXT |
| Derived Attributes | List of pointers |
| Contents | List of pointers |
| Referencing Profiles | List of pointers |
| Class Group Attribute | |
| ID | Integer |
| Name | TEXT |
| Caption | TEXT |
| Description | TEXT |
| ID Status | (Unique, non-unique, none) |
| MinCardinality | Integer |
| MaxCardinality | Integer |
| MinCount | Integer |
| MaxCount | Integer |
| Format | TEXT |
| Container Pointer | Pointer |
| Contents | Ordered list of pointers |
| Base Profile | Pointer |
| Class Formula Attribute | |
| ID | Integer |
| Name | TEXT |
| Caption | TEXT |
| Description | TEXT |
| Expression | TEXT |
| Formula Type | (Not stored, stored) |
| Value Type | Any DBMS Data Type |
| Length | Integer |
| Required Flag | (Yes, No) |
| Format | TEXT |
| Container Pointer | Pointer |
| Base Profile | Pointer |
| Class Object Link Attribute | |
| ID | Integer |
| Name | TEXT |
| Description | TEXT |
| Caption | TEXT |
| ID Status | (Unique, non-unique, none) |
| MinCardinality | Integer |
| MaxCardinality | Integer |
| Container Pointer | Pointer |
| Base Profile | Pointer |
| Pair Pointer | Pointer |
| Class Parent Attribute | |
| ID | Integer |
| Name | TEXT |
| Caption | TEXT |
| Description | TEXT |
| Container Pointer | Pointer |
| Pair Pointer | Pointer |
| Base Profile | Pointer |
| Class Subtype Attribute | |
| ID | Integer |
| Name | TEXT |
| Caption | TEXT |
| Description | TEXT |
| Required Flag | (Yes, No) |
| Container Pointer | Pointer |
| Base Profile | Pointer |
| Pair Pointer | Pointer |
| Class Subtype Group Attribute | |
| ID | Integer |
| Name | TEXT |
| Caption | TEXT |
| Description | TEXT |
| Required Flag | (Yes, No) |
| MinCount | Integer |
| MaxCount | Integer |
| Container Pointer | Pointer |
| Contents | Ordered list of pointers |

Turning now to FIGS. 4A–4D, the overall operation of the computer system programmed according to the present invention is shown. Beginning at a step 100, the computer system prompts the user to enter the type or brand of relational database program used to create the relational database schema that exists in the computer memory. Generally, there are two types of relational databases. The first type has a catalog that includes relationship information. As will be described below, the relationship information indicates which columns of a table are defined as foreign keys to other tables in the database. The second type of database does not include the relationship information in the database catalog. The present invention is designed to work with either type of database.

After the user has entered the type of relational database program that was used to create the existing relational database schema, the program uses a look-up table (not shown) that is stored within the internal memory of the computer or on the disk drive to determine whether the catalog includes the relationship information at a step 102.

If the catalog does not include the relationship information, the computer system creates the corresponding semantic object model using the steps shown in FIGS. 12A–12D as will be described below.

If the catalog of the relational database includes the relationship information, the computer system first opens the relational database catalog at a step 106. The catalog includes a definition of each relational table in the database as well as a definition of each column within a particular table.

At a step 108, the computer system first creates an instance of the Album class defined above. The album class is used to keep track of each semantic object in the semantic object model. After creating the instance of the Album class, the computer system begins a loop at step 110 that analyzes each table defined in the database catalog. At a step 112, the computer system creates an instance of the Semantic Object class for each table defined in the database catalog. Each instance of the Semantic Object class represents a semantic object in the corresponding semantic object model that is displayed for the user.

The instance of the semantic object class is assigned a unique identification number at a step 114. At a step 116, the Name member variable is initialized to the name of the table defined in the database from which the semantic object was created. At a step 118 (FIG. 4B), the Caption and Description member variables are initialized as empty strings. In the example shown in FIGS. 1 and 2, step 110–118 will create the Customer semantic object 22 from the table 5, the Artist semantic object 30 from the table 7 and the Painting semantic object 11 from the table 11.

As indicated above, the instance of the Album class created for the semantic object model maintains a list of each semantic object included within the model. At a step 120, a pointer is placed to the newly-created instance of the Semantic Object Class in the contents list of the album.

For each semantic object created, the computer system creates an instance of the Object Link Profile class. As described in the '997 patent application, profiles are used as templates from which corresponding attributes are created. The profiles maintain a list of attributes that are derived from them. If a user changes a property, i.e., the default values of the member variables of a profile, the computer system can then update the property in each derived attribute created from the profile, thereby allowing global attribute property changes to be made simply and efficiently.

At a step 124, the ID member variable of the object link profile is assigned a unique number. The Name, Caption and Description member variables of the object link profile are initialized from the corresponding semantic object at a step 126. The member variable ID_Status is initialized to "none" at a step 128. The ID_Status member variable can be set to any of the enumerated values "none," "non-unique," or "unique." At a step 130, the Base Semantic Object pointer is initialized to the address of the semantic object that caused the object link profile to be created.

Figure 4A:
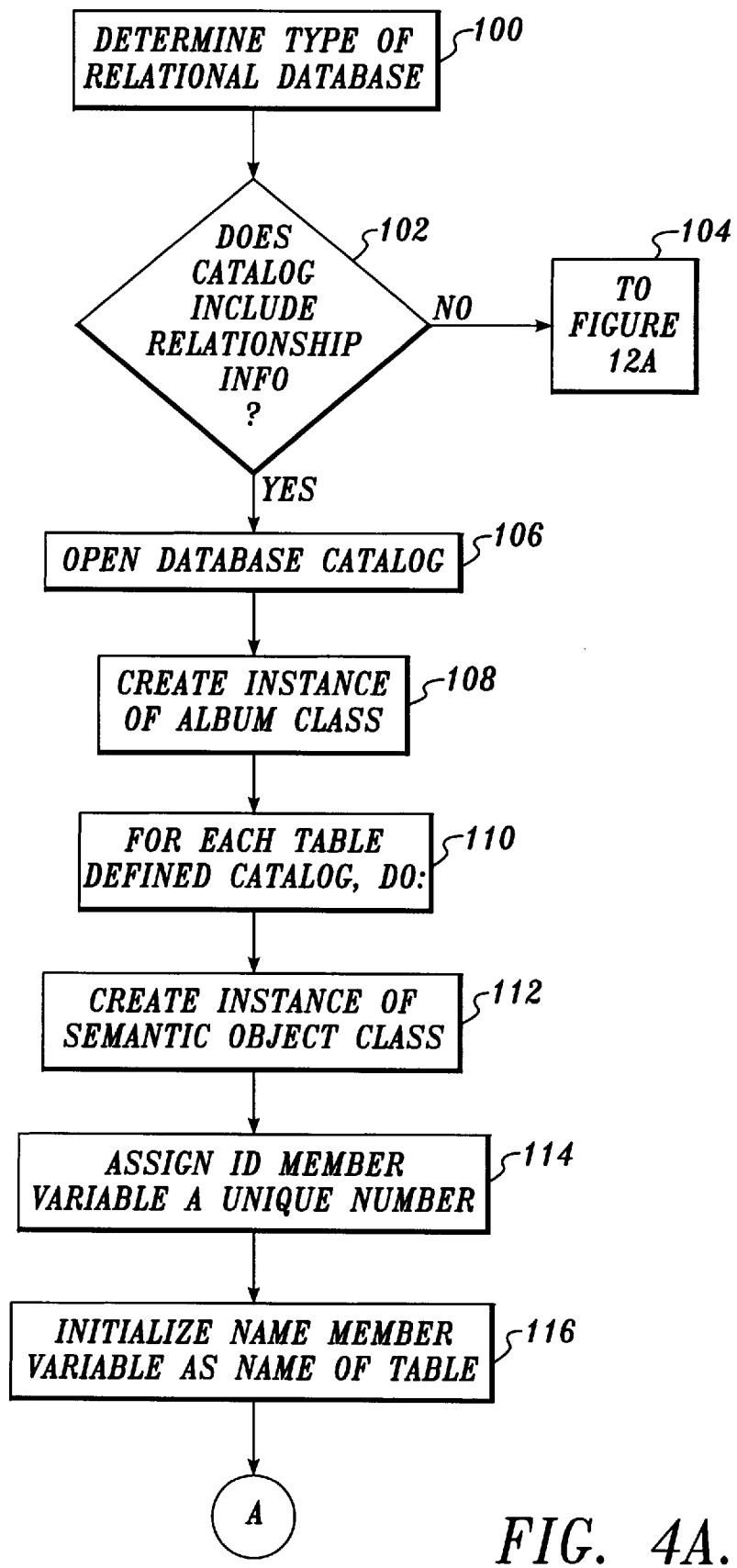
FIGS. 4A–4D are a series of flow charts showing the steps performed by the computer system of the present invention to create a semantic object model from an existing relational database schema.
Figure 4B:
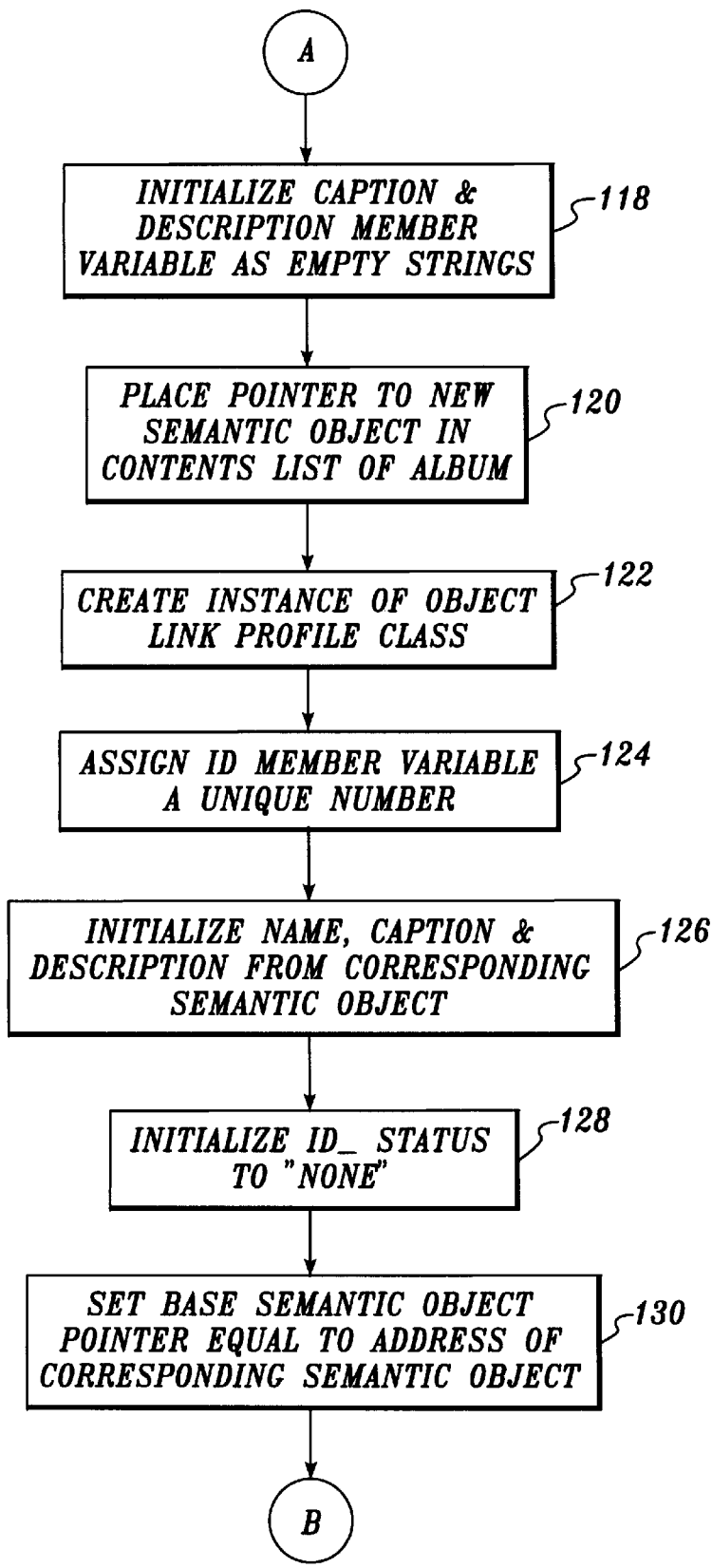
Figure 4C:
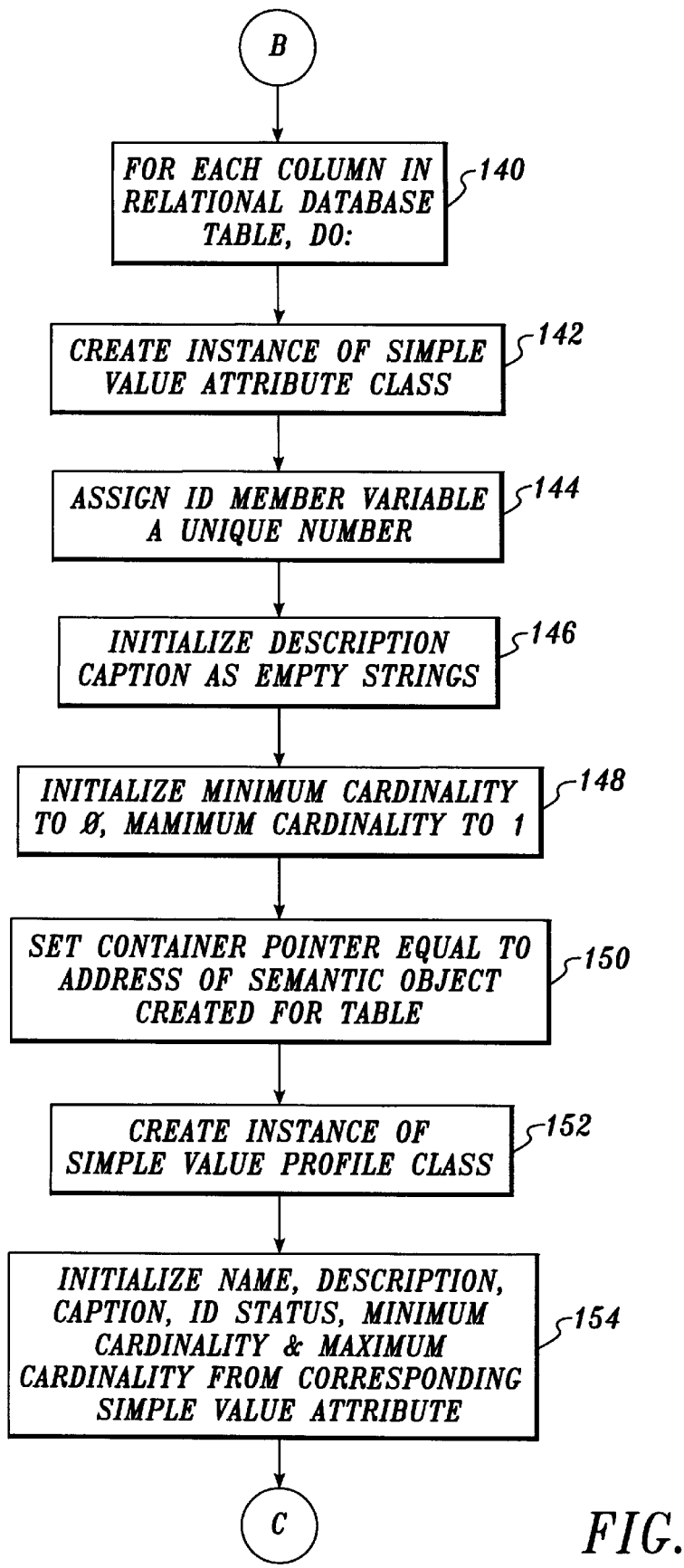

Turning now to FIG. 4C, once the semantic object and object link profile have been created, the computer system begins a loop at step 140 that analyzes each column defined in the database catalog for a table within the relational database. For each column defined in a table, the computer system creates an instance of the Simple Value Attribute class defined above at step 142.

For example, the column labeled "Phone" in the table 5 is used to create the simple value attribute labeled "Phone" in the customer semantic object 22. The ID member variable of the newly created simple value attribute is assigned a unique number at a step 144, and the Description and Caption member variables are initialized as empty strings at a step 146. At a step 148, the Minimum Cardinality member variable is initialized to zero, and the Maximum Cardinality member variable is initialized to one. At step 150, the container pointer of the simple value attribute is initialized to be the address of the semantic object in which the attribute is logically contained. Typically, the container pointer points to either an instance of Semantic Object class or a group attribute, as will be discussed below.

Once the simple value attribute has been created, the computer system creates an instance of the Simple Value Profile class at a step 152. At a step 154, the Name, Description, Caption, ID_Status, Minimum Cardinality, and Maximum Cardinality member variables are initialized from the corresponding simple value attribute previously created.

Figure 4D:
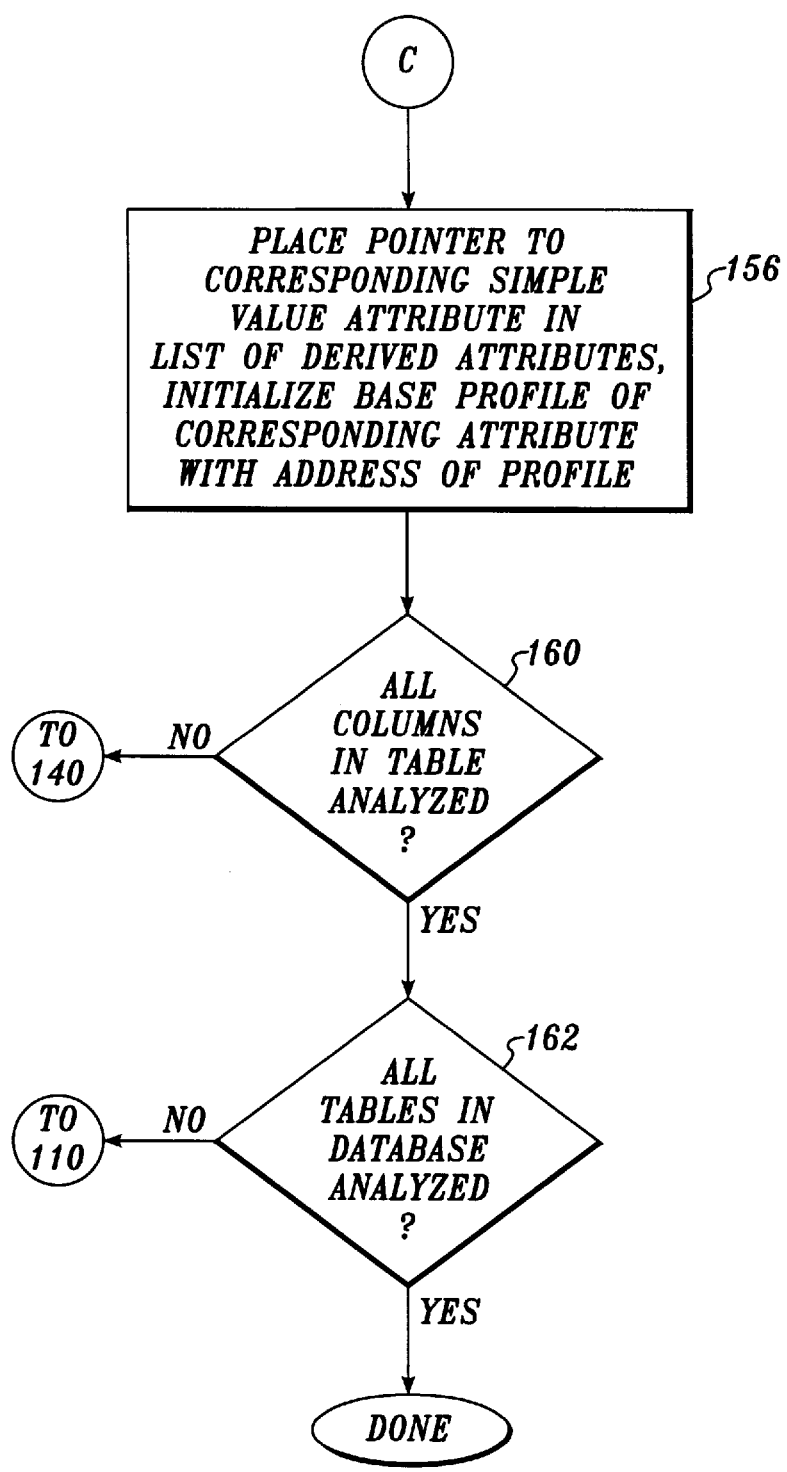

Turning now to FIG. 4D, a pointer to the corresponding simple value attribute is placed in the simple value profile's list of derived attributes and the address of the profile is used to initialize the Base Profile pointer of the corresponding attribute at a step 156. At a step 160, the computer system determines whether all the columns defined for the table under consideration have been analyzed. If not, the computer system loops back to step 140 (FIG. 4C). Once all columns in a particular table have been analyzed, the computer system determines whether all tables defined in the database catalog have been analyzed at a step 162. If not, the computer system loops back to step 110 (FIG. 4A) and creates another instance of the Semantic Object class, as described above.

After the steps shown in FIGS. 4A–4D have been completed by the computer, the corresponding semantic object model will contain a plurality of semantic objects, each of which contains a simple value attribute for each column defined in the corresponding relational database table. After creating the semantic objects, the computer system interprets the relationship information stored in the database catalog to create the appropriate object link attributes and multivalued group or multivalued, simple value attributes.

To determine whether a table in the database catalog should have been translated into a multivalued object link attribute instead of a semantic object, the computer system scans the database catalog for intersection tables that only contain columns that are defined as foreign keys. In the example shown in FIG. 1, the table 15 is an intersection table because its columns labeled "Name_1" and "Name_2" are foreign keys to the tables 5 and 7 respectively.

Figure 5:
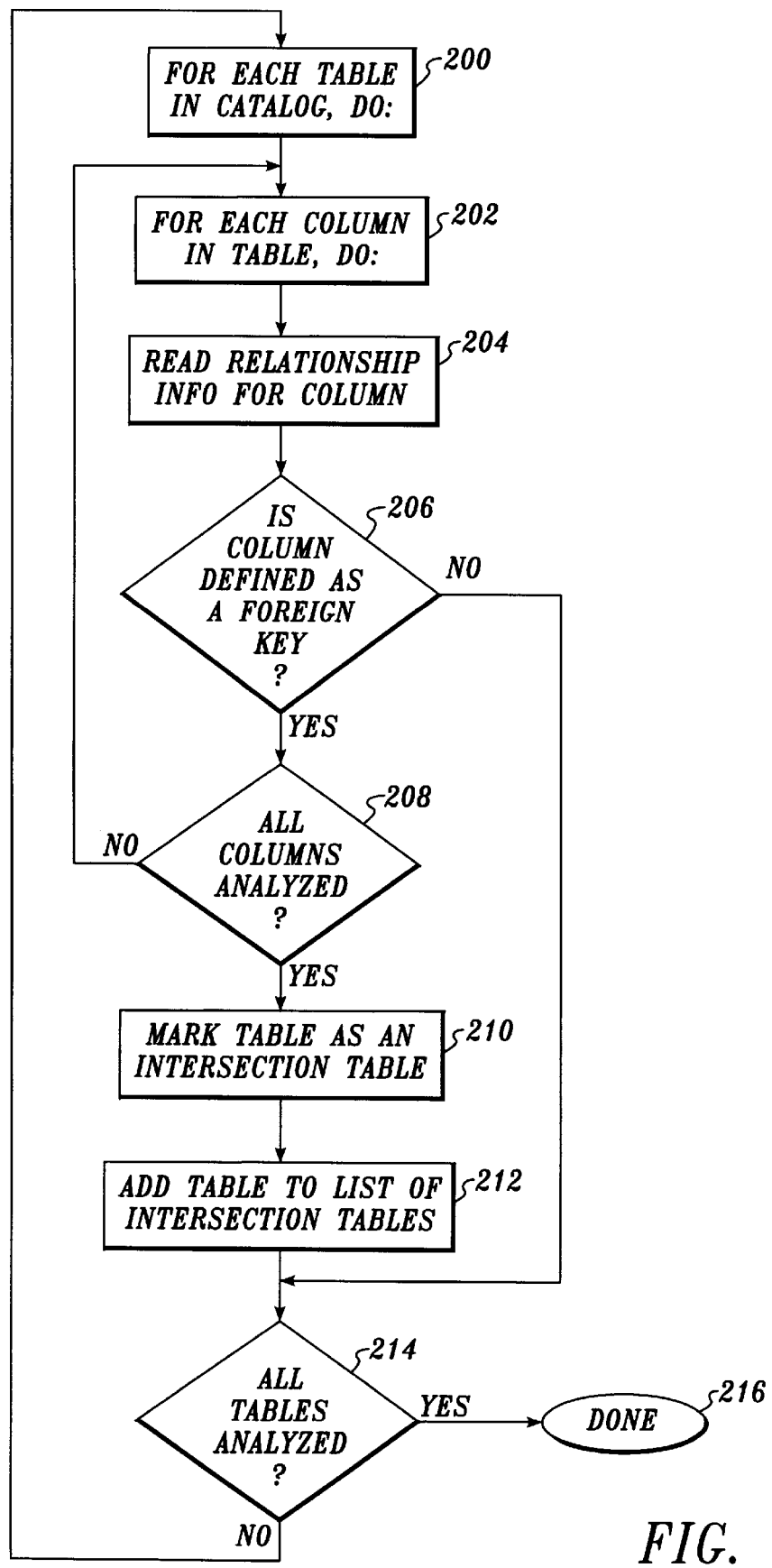
FIG. 5 is a flow chart showing the steps performed by the computer system of the present invention to detect intersection tables when the relational database catalog provides relationship information.

As shown in FIG. 5, the computer system is programmed to detect intersection tables by beginning an outer loop at a step 200 that analyzes the definition of each table in the database catalog. At a step 202, the computer system begins an inner loop that analyzes each column defined for a table. For each column, the computer system reads the relationship information that is stored in the catalog at a step 204. At a step 206, the computer system determines whether the column is defined as a foreign key. If not, the computer system is programmed to determine that the table cannot be an intersection table, and processing proceeds to the next table defined in the database catalog.

If the answer to step 206 is yes, the computer system then determines whether all the columns in a table have been analyzed. If not, the computer system loops back to step 202 and analyzes the remaining columns in the table. If each column in a table is defined as a foreign key, the computer system marks the table as an intersection table at a step 210. The name of the table is then added to a list of intersection tables at a step 212.

After adding the table to the list of intersection tables, processing then proceeds to a decision block 214, wherein the computer system determines whether all the tables in the database catalog have been analyzed. If not, the next table in the database catalog is analyzed. Once all the tables in the database catalog have been analyzed, the computer system will have a list of each intersection table defined within the database schema and processing stops at step 216.

Once all the intersection tables in the database have been found, the computer system then scans the database catalog for tables that should have been translated into multivalued group attributes or multivalued, simple value attributes. For example, the table 9 shown in FIG. 1 is not representative of a semantic object but holds a record of the many media in which an artist may work. Therefore, the computer system will operate to delete the semantic object model created for this table and replace it with a simple value attribute labeled "Medium" having a maximum cardinality of N within the semantic object 30.

Figure 6:
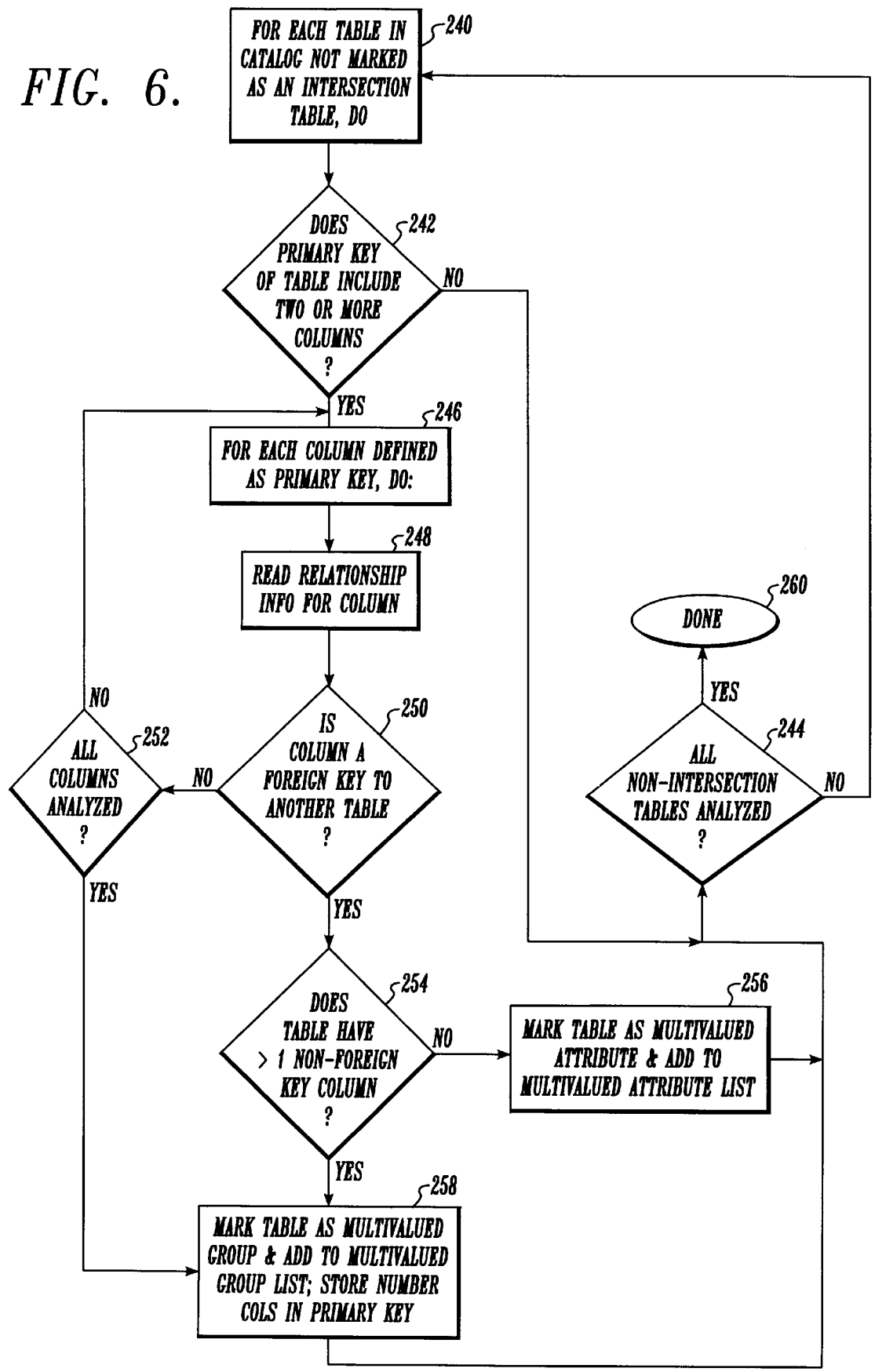
FIG. 6 is a flow chart showing the steps performed by the computer system to detect tables in the relational database schema that should be converted into multivalued groups or multivalued, simple value attributes in the semantic object model.

As shown in FIG. 6, the computer system begins a loop at step 240 that analyzes each table defined in the database catalog that has not been previously marked as an intersection table. At a decision block 242, the computer system determines whether the primary key of the table under consideration includes two or more columns. Tables having primary keys that do not include two or more columns are not modeled as multivalued groups or multivalued, simple value attributes. Processing then proceeds to step 244, where a decision is made if all non-intersection tables in the database catalog have been analyzed.

If the answer to step 242 is yes, and the primary key includes at least two columns, the computer system begins an inner loop that analyzes each column defined as part of the table's primary key at a step 246. At a step 248, the relationship information for each column defined as part of the table's primary key is read. At a decision block 250, the computer system determines whether the column under consideration is also defined as a foreign key to a column in another relational table. If not, the computer system then determines whether all columns defined as the primary key of the table have been analyzed at a step 252. If not, processing loops back to step 246, and the next column defined as the primary key is analyzed. If the answer to step 252 is yes, then processing proceeds to step 244 and the next non-intersection table in the database catalog is analyzed.

If the answer to decision step 250 was yes, the computer system then determines whether the table under consideration has more than one non-foreign key column at step 254. If not, the table is marked as a multivalued, simple value attribute and the name of the table is added to a list of multivalued, simple value attributes at a step 256. If the table has more than one non-foreign key column, the table is marked as a multivalued group, and the table name of the table is added to a list of multivalued groups at a step 258. In addition to adding the table to the list of multivalued groups, the computer records the number of columns defined as the primary key of the table for reasons that are explained below.

Processing then proceeds to step 244 that determines if all non-intersection tables in the database catalog have been analyzed. If not, the next table defined in the catalog is analyzed at step 240. If all non-intersection tables have been analyzed, processing ends at step 260. After the computer system has performed the steps shown in FIG. 6, a list of all tables in the database that represent multivalued groups and multivalued, simple value attributes will have been created.

After performing the steps shown in FIG. 6, the computer system then searches the database catalog for tables not marked as intersection tables, multivalued groups, or multivalued, simple value attributes that include foreign keys to other tables in the database. If the foreign keys are not part of the primary key of a table, the present invention translates the foreign keys into corresponding object link attributes that define a relationship between two semantic objects. In the example shown in FIG. 1, the table 11 includes a column labeled "Name_1" that should be translated into an object link attribute to link the Artist semantic object 30 to the Painting semantic object 40.

Figure 7A:
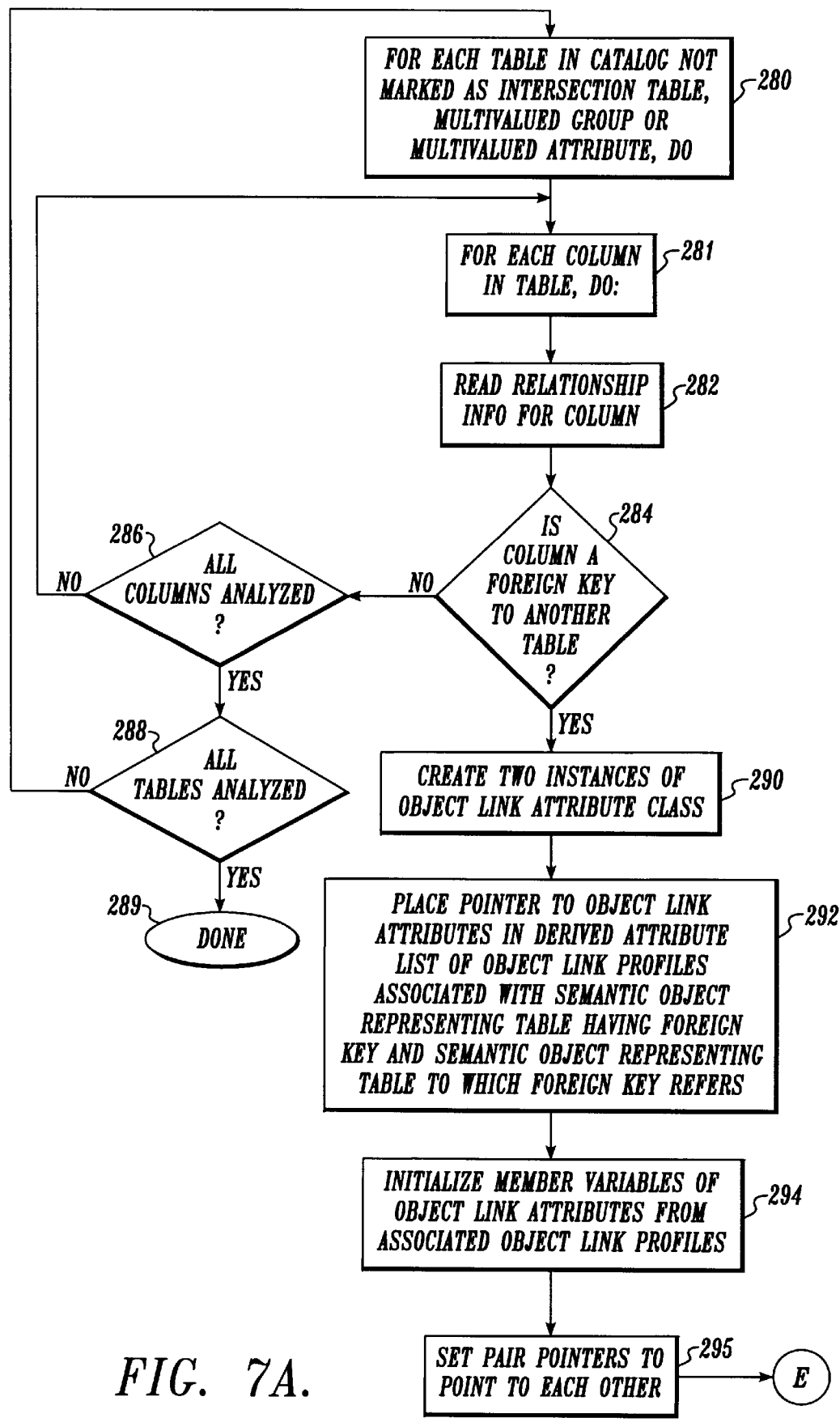
FIGS. 7A and 7B are flow charts showing the steps taken by the computer system to convert a semantic object within the semantic object model into an object link attribute when the relational database catalog provides relationship information.
Figure 7B:
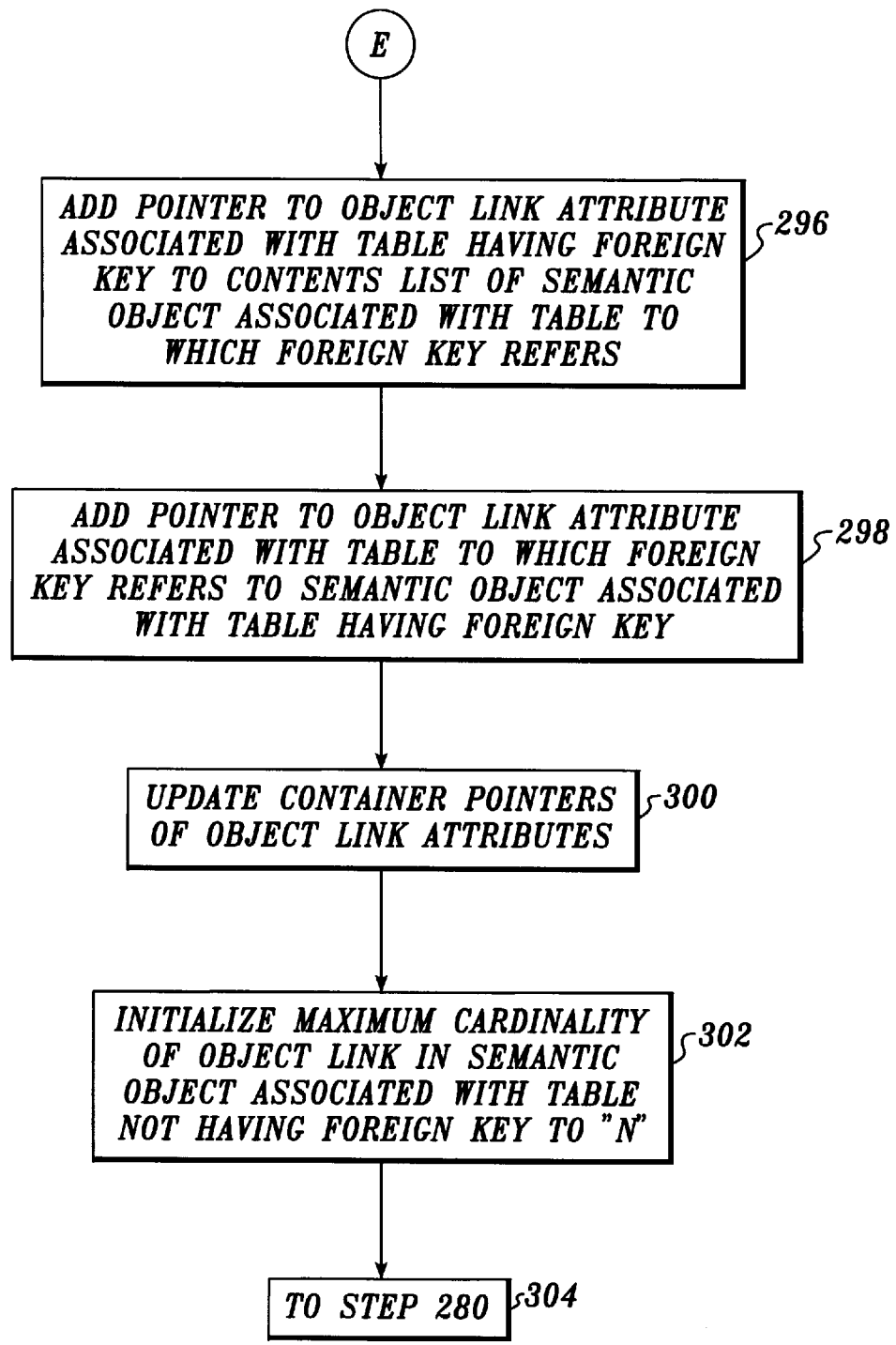

As shown in FIGS. 7A and 7B, the computer system begins a loop at step 280 that analyzes each table in the database that was not previously marked as an intersection table, multivalued group, or multivalued, simple value attribute. At a step 281, the computer system begins an inner loop that analyzes each column defined for the remaining tables. The relationship information for a column is read at a step 282 and a decision is made at step 284 whether the column is defined as a foreign key to a column in another table of the relational database.

Those skilled in the art will recognize that a foreign key may be defined as multiple columns in a table. In that case, step 284 must analyze the complete foreign key so that only one pair of object link attributes is created for the entire foreign key. If a column under consideration is not a foreign key, then processing proceeds to a step 286, wherein it is determined if all columns in the table have been analyzed. If not, processing loops back to step 281 and the next column in the table is analyzed.

Once all columns in a table have been analyzed, processing proceeds to step 288, wherein it is determined if all of the remaining tables in the database catalog have been analyzed. If not, processing returns to step 280 and the next non-intersection, multivalued group or multivalued attribute table is analyzed. This process proceeds until all such tables have been analyzed and processing stops at step 289.

If the answer to decision block 284 is yes, meaning that a table includes a column that is defined as a foreign key to a column of another table, the computer system creates two instances of the object link attribute class at a step 290.

After the instances of the object link attribute class have been created, the attributes are placed in the corresponding semantic objects in order to represent the relationship defined by the foreign keys. For example, as shown in FIG. 1, the table 7 that stores data regarding an artist, is linked to the table 11 that stores data regarding a painting by the foreign key stored in the column labeled Name_1. This relationship is represented in the corresponding semantic object model (shown in FIG. 2) by the object link attribute labeled "Painting" within the semantic object 30 and the corresponding object link attribute labeled "Artist" that is within the semantic object 40.

To logically place the newly created object link attributes in the correct semantic object, the computer system first places a pointer to the newly created object link attributes in the Derived Attributes list of the object link profiles associated with the semantic object representing the table having the foreign key and the semantic object representing the table to which the foreign key refers at step 292. In the Artist-Painting example described above, a pointer to an object link attribute would be placed in the Derived Attributes list of the object link profile associated with the Artist semantic object 30 and the Derived Attributes list of the object link profile associated with the Painting semantic object 40. In addition, the base profile pointers of the object link attributes are set equal to the address of their associated object link profile.

At a step 294, the member variables of the object link attributes are initialized from their associated object link profile. The pair pointers of the object link attributes are then set to point to each other at step 295.

At a step 296 (FIG. 7B) a pointer to the object link attribute associated with the table having the foreign key is added to the Contents list of the semantic object associated with the table to which the foreign key refers. At a step 298, a pointer to the object link attribute associated with the table to which the foreign key refers is added to the Contents list of the semantic object associated with the table having the foreign key. The Container pointers of the object link attributes are updated with the address of the semantic object in which they are logically contained at a step 300.

At a step 302, the maximum cardinality of the object link attribute contained in the semantic object associated with the table not having the foreign key is initialized to N to represent a one-to-many relationship. For example, in the Artist-Painting example described above, it can be seen that the object link attribute labeled "Painting" within the Artist semantic object 30 has a maximum cardinality of N, representing the fact that one artist may have painted many paintings. At a step 304, the computer system loops back to step 280 (FIG. 7A) and the next table in the database catalog is analyzed.

Those skilled in the art will recognize that the steps shown in FIGS. 7A and 7B will incorrectly identify one-to-one relationships as one-to-many relationships. However, the user can easily correct this by altering the Maximum Cardinality property of the object link attribute after the entire semantic object model is completed. Alternatively, the computer system can look at the database catalog to determine if the foreign key is unique. If so, the maximum cardinality of the object link attribute in the semantic object associated with the table not having the foreign key is set to one.

After the object link attributes representing one-to-many relationships (or one-to-one if the foreign key is unique) have been added to the semantic object model, the computer system then analyzes the list of intersection tables to create multivalued object link attributes representing many-to-many relationships in the semantic object model.

Figure 8:
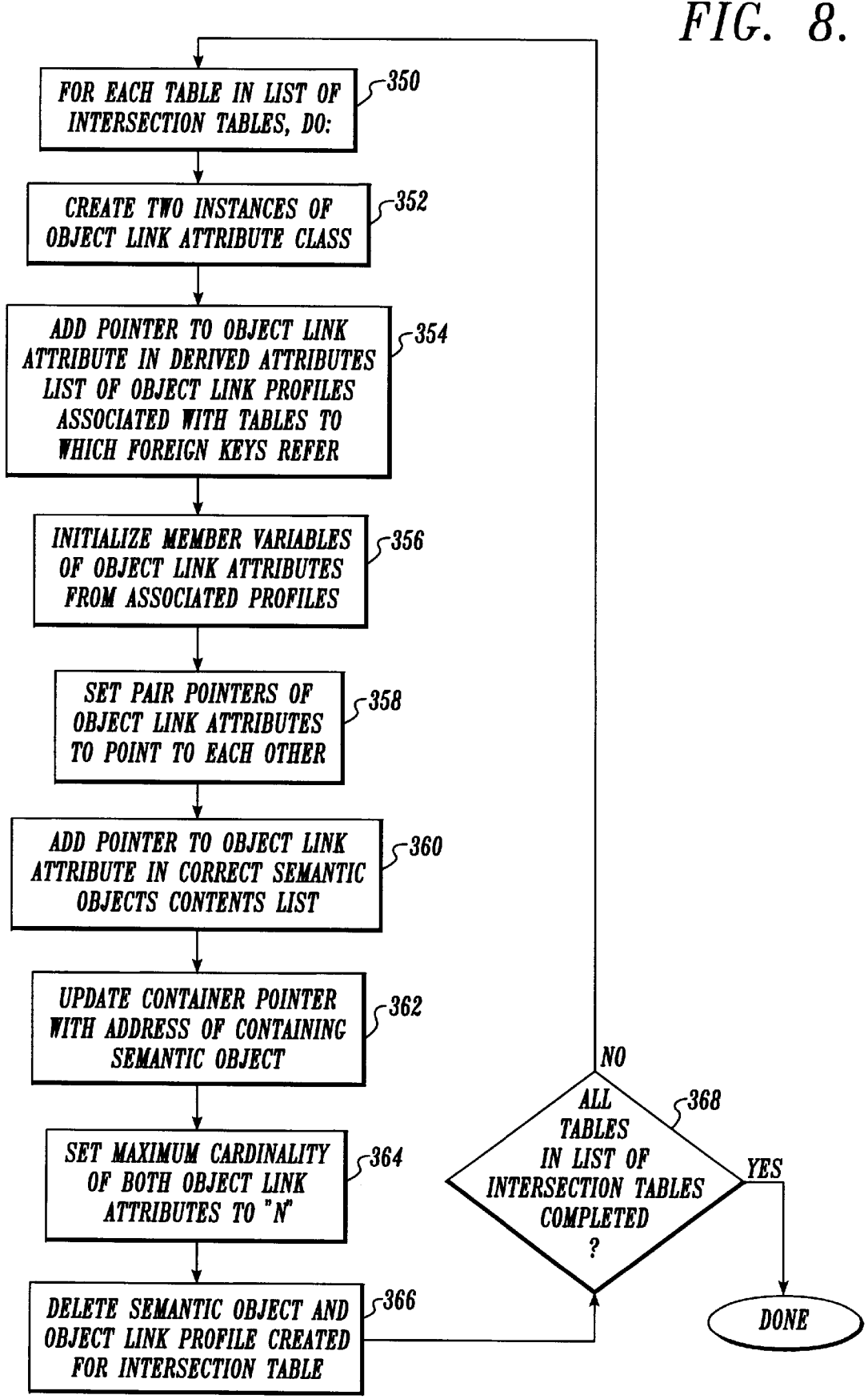
FIG. 8 is a flow chart of the steps taken by the computer system to convert an intersection table into a pair of multivalued object link attributes when the relational database catalog includes relationship information.

Turning now to FIG. 8, the computer system creates the object link attributes representing many-to-many relationships by analyzing each table within the list of intersection tables beginning with step 350. At a step 352, two instances of the object link attribute class are created. At a step 354, a pointer to the newly created object link attributes is added to the Derived Attributes list of the object link profiles associated with the tables to which the foreign keys in the intersection table refer. The member variables of the object link attributes are initialized from their corresponding object link profiles at a step 356. The pair pointers of the two object link attributes are then initialized to point to each other at step 358.

At a step 360, the computer system logically places the object link attributes in the associated semantic object by adding a pointer to the object link attribute in the corresponding semantic object's Contents list. For example, as shown in FIG. 1, table 15 is an intersection table representing the many-to-many relationship between a customer and an artist. In the semantic object model shown in FIG. 2, the intersection table is represented as the multivalued object link attribute labeled "Artist" within the semantic object 22 and the multivalued object link attribute labeled "Customer" found in the semantic object 30. Therefore, the object link attribute initialized from the object link profile associated with the Customer semantic object 22 is added to the Contents list of the Artist semantic object 30 and the object link attribute initialized from the object link profile associated with the Artist semantic object 30 is added to the Contents list of the Customer semantic object 22. The container pointers of each object link attribute are updated to equal the address of the semantic object in which they are logically contained at step 362. At a step 364, the maximum cardinality of both object link attributes is initialized to "N".

Because the computer system initially creates a semantic object for each table found in the database, semantic objects will be improperly created for each intersection table defined in the database schema. Therefore, the computer system deletes the semantic object and its corresponding object link profile created for the intersection table at step 366.

At a step 368, the computer system determines whether each table in the list of intersection tables has been analyzed. If not, the system loops back to step 350 and retrieves the next entry in the list of intersection tables. Once all the entries in the list of intersection tables have been analyzed, the processing is complete.

After the steps shown in FIGS. 7A–7B and 8 are completed, the semantic object model will contain object link attributes representing one-to-many and many-to-many relationships.

FIGS. 9A–D show the steps taken by the present invention to correctly model attributes that should be placed in a multivalued group attribute. As can be seen in FIG. 2, the Customer semantic object 22 includes a multivalued group labeled "Purchase." The multivalued group includes two simple value attributes labeled "Date" and "Price," as well as an object link attribute labeled "Painting" that relates the semantic object 22 to the semantic object 40. Because multivalued groups are stored in their own table in the relational database, the computer system will incorrectly create a semantic object corresponding to the multivalued group table during the first pass of the analysis. Therefore, the steps shown in FIGS. 9A–9D operate to delete the semantic object created for the table that stores the data of the multivalued group and will place the attributes corresponding to the columns of the table within a multivalued group attribute within the proper semantic object.

Beginning at a step 380, the computer system sorts entries in the list of multivalued groups created by steps shown in FIG. 6, by the number of columns in their primary key. Once this is completed, the computer system processes each entry in the list of multivalued groups beginning with the entry having the most columns in its primary key at a step 382.

At a step 384, the computer system analyzes each entry in the list of multivalued groups. For each multivalued group table in the list, the computer system creates an instance of the Group Attribute class at a step 386. The ID member variable is assigned a unique number at a step 388 and the Caption and Description member variables are initialized to empty strings at a step 390. At a step 392, the Minimum Cardinality of the group is initialized to zero and the Maximum Cardinality is initialized to N.

Each group attribute stores an indication of the minimum number of member attributes within the group that must be present in order for the entire group to be valid. This number stored in the Minimum Count member variable and is initialized to zero at step 394. Similarly, the member variable, Maximum Count, stores the maximum number of member variables that can be present in the group in order for the group to be valid.

Figure 9A:
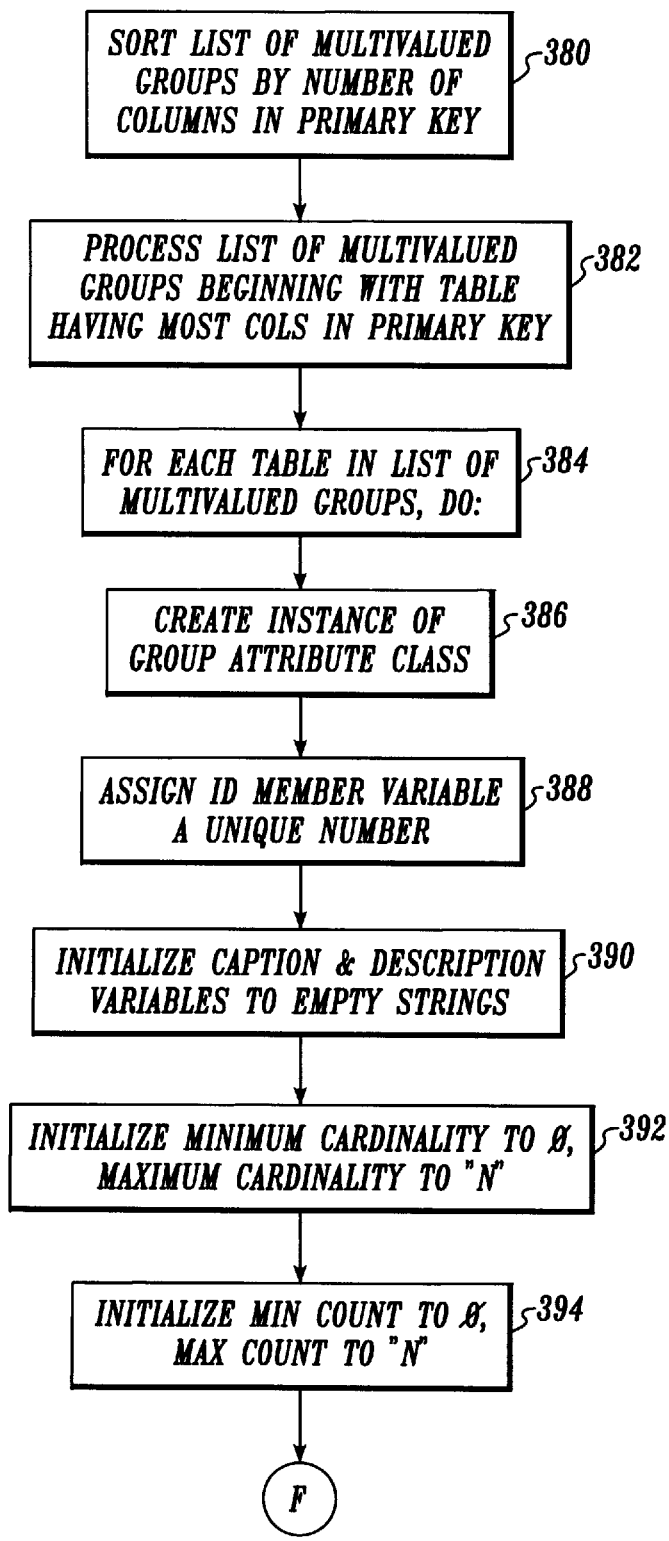
FIGS. 9A–9D are a series of flow charts showing the steps performed by the computer system to create a multivalued group attribute within a semantic object.
Figure 9B:
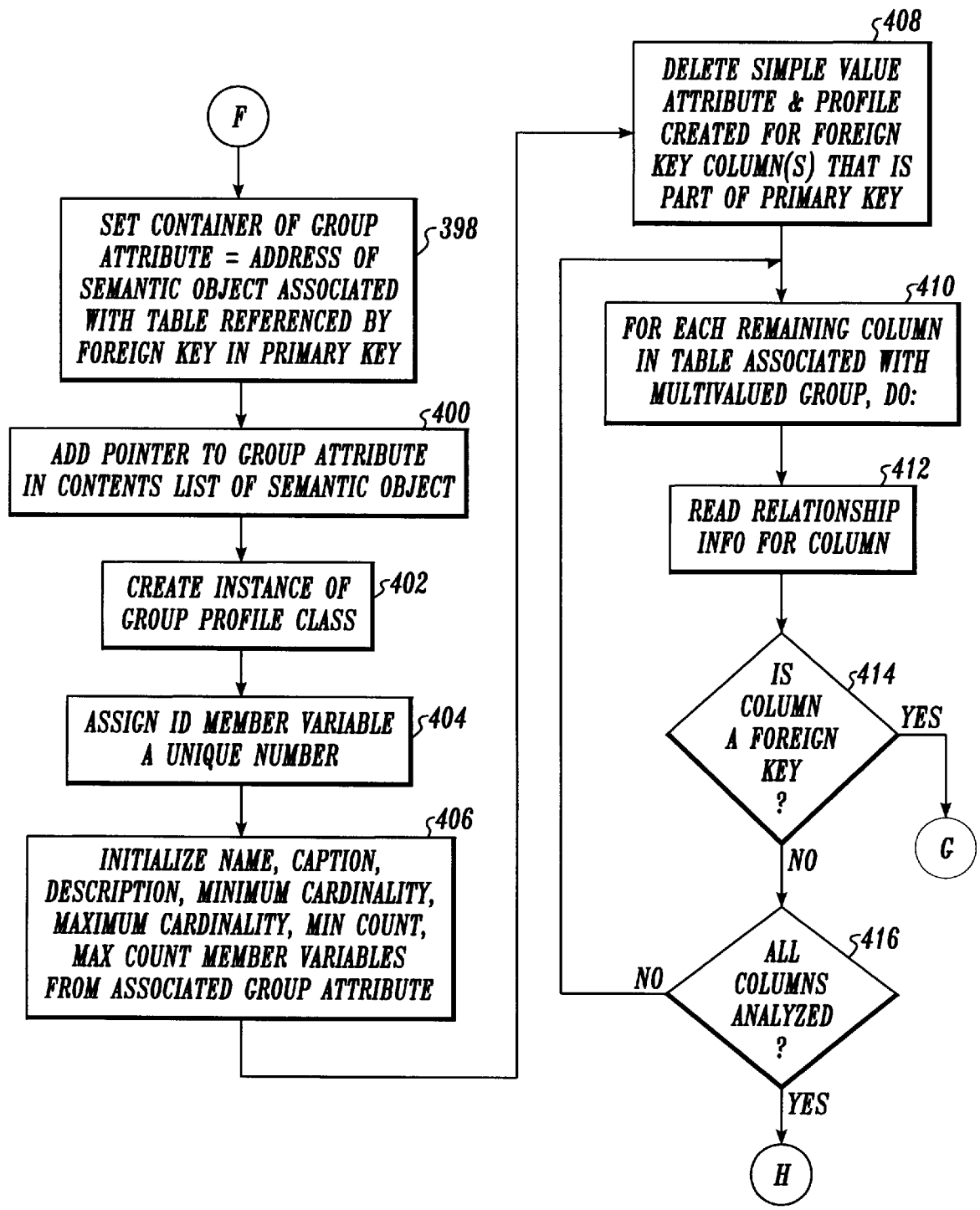

Turning now to FIG. 9B, the container pointer of the group attribute is set equal to the address of the semantic object associated with the table referenced by the foreign key that is part of the primary key of the multivalued group table at step 398. Finally, at a step 400, the computer system adds a pointer to the newly created group attribute in the Contents list of the containing semantic object.

Once the group attribute has been created, the computer system creates a corresponding instance of the group profile class at a step 402. The ID member variable is assigned a unique number at a step 404 and the Name, Description, Caption, Minimum Cardinality, Maximum Cardinality, Min Count, and Max Count member variables are initialized from the associated group attribute at a step 406.

During the first pass that the computer system makes to create the semantic object model, the computer system will have created a simple value attribute for the foreign key column(s) that is part of the primary key. Therefore, the computer system deletes the simple value attribute (or attributes if the foreign key is defined as multiple columns) and its corresponding profile from the semantic object model at step 408.

It is possible that the columns of a multivalued group table may contain a foreign key that was incorrectly identified as a simple value attribute. Therefore, the computer system begins a loop at step 410 that analyzes the remaining columns of the table, i.e., those columns not defined as part of the primary key. At a step 412, the computer system reads the relationship information for each column and determines whether the column is a foreign key at a step 414. If not, the computer system proceeds to a step 416 wherein it is determined if all the columns of the table have been analyzed. This process repeats until all the remaining columns in the table have been analyzed.

Figure 9C:
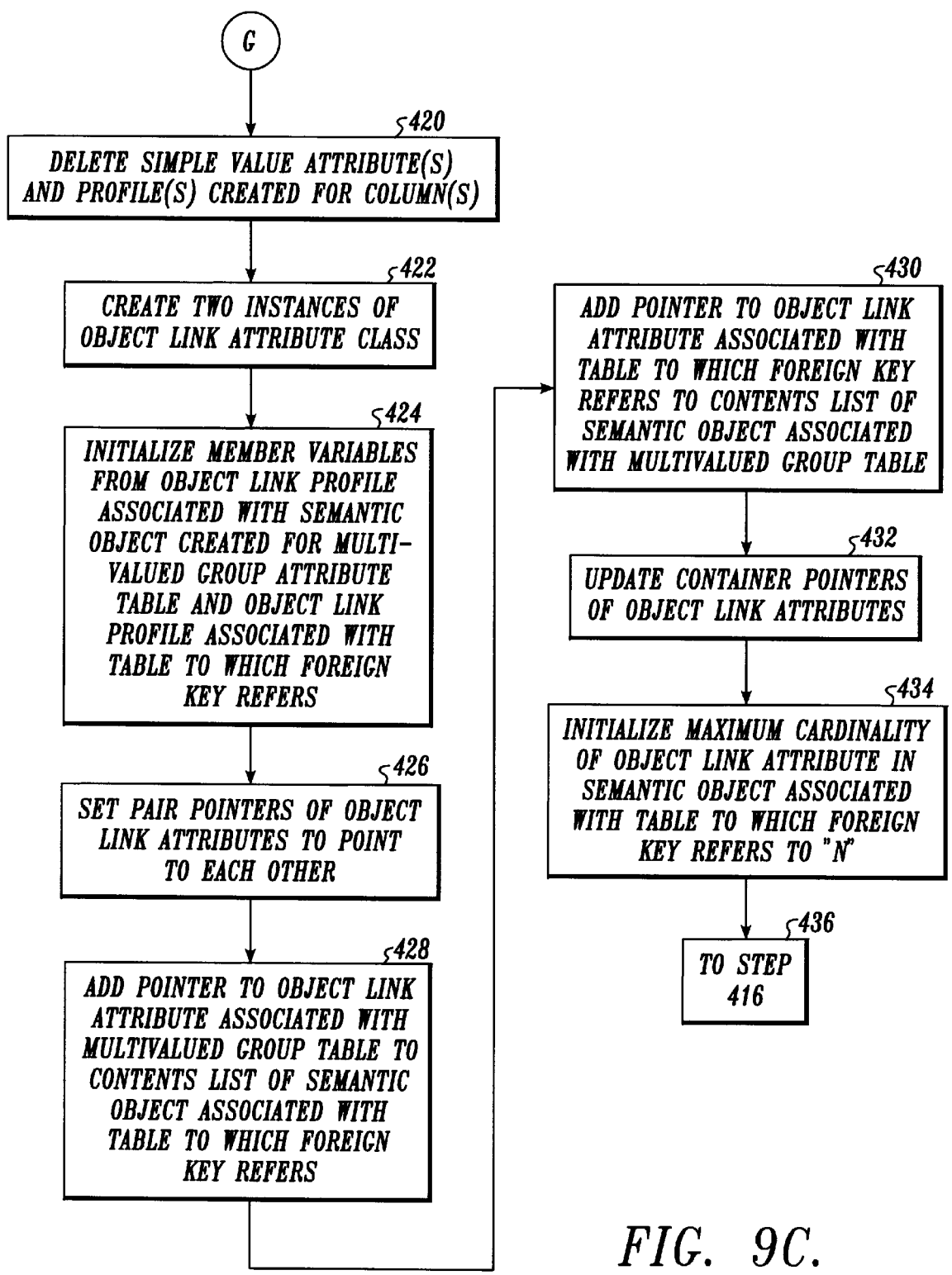

If the answer to step 414 was yes, meaning that the column was defined as a foreign key, the computer system performs the steps shown in FIG. 9C. Again, if the foreign key was defined as two or more columns, the steps of FIG. 9C are performed for each column included in the foreign key. Beginning at a step 420, the computer system deletes the simple value attribute(s) and profile(s) originally created for the columns of the foreign key from the semantic object model. At a step 422, the computer system then creates two instances of the object link attribute class. The member variables of the object link attribute class are initialized from their corresponding object link profiles associated with the semantic object created for the multivalued group attribute table and the object link profile associated with the semantic object created from the table to which the foreign key refers at a step 424.

At step 426, the Pair pointers of the object link attributes are set to point to each other. A pointer to the object link attribute associated with the semantic object created from the multivalued group table is added to the Contents list of the semantic object associated with the table to which the foreign key refers at step 428. Similarly, a pointer to the object link attribute associated with the semantic object created from the table to which the foreign key refers is added to the contents list of the semantic object associated with the multivalued group table at a step 430.

At a step 432, the Container pointers of each object link attribute are updated to point to their containing semantic object. The Maximum Cardinality of the object link attribute that is included in the semantic object associated with the table to which the foreign key refers is initialized to "N" at a step 434. At a step 436, processing returns to step 416 in FIG. 9B and the remaining columns of the table are analyzed.

Figure 9D:
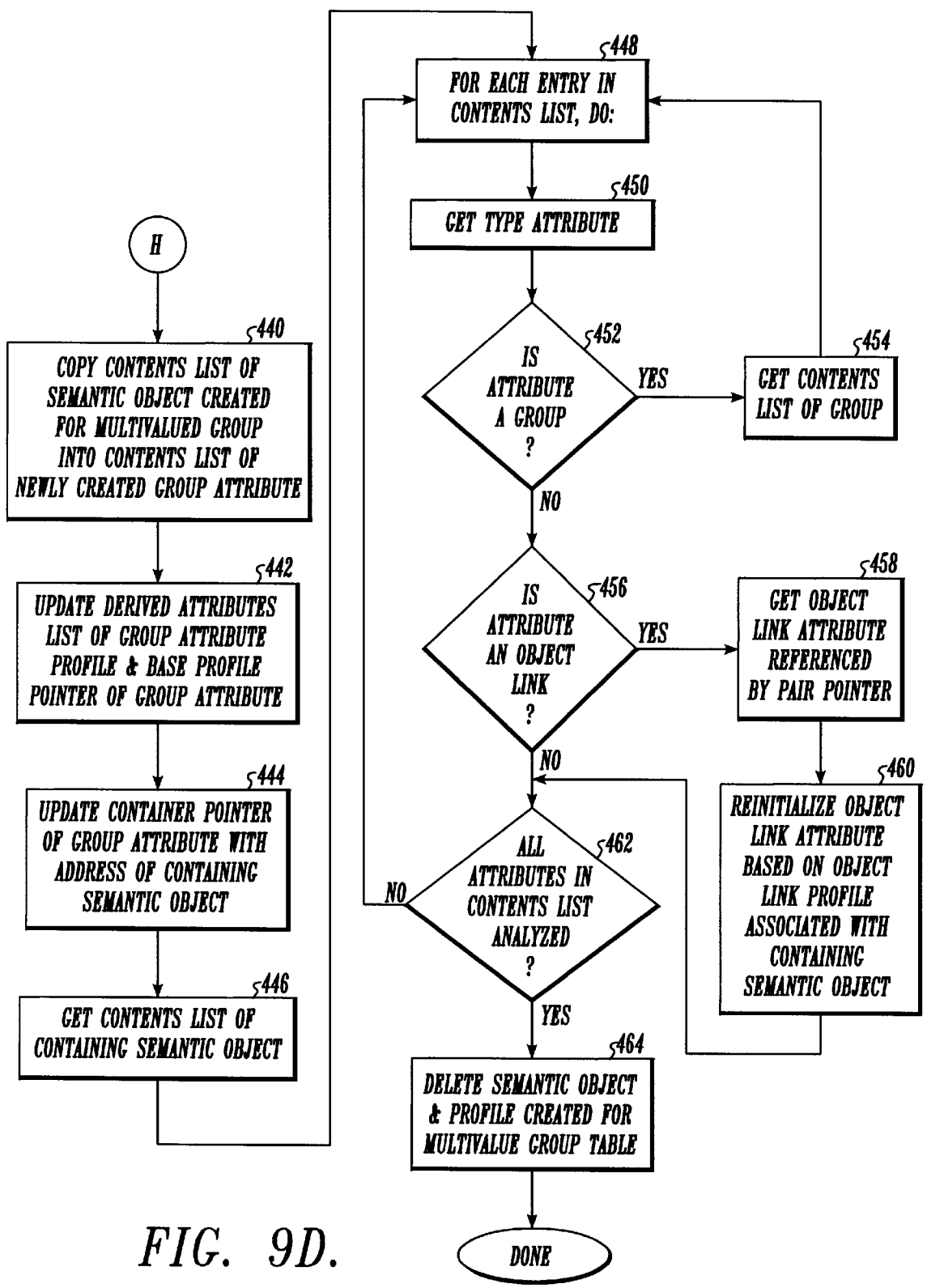

After each column in the multivalued group attribute table has been analyzed, processing proceeds to the steps shown in FIG. 9D. At a step 440, the Contents list of the semantic object originally created for the multivalued group table is copied into the Contents list of the newly created group attribute.

At step 442, the Derived Attributes list of the group attribute profile is updated to include the new group attribute and the base profile pointer of the group attribute is set to point to the newly-created group attribute profile. At step 444, the Container pointer of the group attribute is set equal to the address of the containing semantic object.

Any object link attributes within a multivalued group are paired with a corresponding object link attribute that is located in another semantic object. For example, as can be seen in FIG. 2, the group attribute labeled "Purchase" includes an object link attribute labeled "Painting" that is included within the semantic object 22. Paired with the object link attribute is a corresponding object link attribute labeled "Customer" that is found within the semantic object 40. At the time the pair of object link attributes are created, the object link attribute shown as "Customer" will initially be created to correspond to the semantic object defined for the multivalued group labeled Purchase. However, the present invention does not allow an object link attribute to associate a semantic object with a group attribute. Therefore, the object link attribute located in the paired semantic object must be updated to refer to the semantic object in which the multivalued group is contained. In the example shown in FIG. 2, the object link attribute labeled "Customer" must be reinitialized with the object link profile created for the semantic object 22.

To accomplish this, the computer system begins a loop that retrieves the Contents list of the semantic object containing the multivalued group at step 446. At a step 448, the computer system begins analyzing each entry in the Contents list. At step 450, the computer system reads the type of each attribute in the Contents list, namely, simple value, group, or object link attribute. At a step 452, the computer system determines whether the attribute in the Contents list is a group. If so, the computer system gets the Contents list of the group attribute at a step 454 and processing returns to step 448 wherein each attribute within the new Contents list is analyzed. This recursive process continues until no additional nested group attributes are found.

If the answer to step 452 was no, the computer system determines whether the attribute is an object link-type attribute at step 456. If so, the computer system retrieves the object link attribute referenced by the attribute's Pair pointer at a step 458. At a step 460, the object link attribute referenced by the Pair pointer is reinitialized based on the object link profile associated with the semantic object to which the group attribute was added. As explained above, in the example shown in FIG. 2, the object link attribute labeled "Customer" in the semantic object 40 was originally initially created from an object link profile associated with a semantic object labeled "Purchase." Step 460 serves to reinitialize the object link attribute based on the object link profile created from the Customer semantic object 22. After the object link attribute has been reinitialized, processing proceeds to step 462 wherein it is determined if all attributes in the Contents list have been analyzed. If not, processing returns to step 448 and the next entry is analyzed. At a step 464, the semantic object and its corresponding object link profile originally created for the multivalued group table are deleted from the semantic object model.

After the intersection tables and multivalued group tables have been analyzed, the computer system updates the semantic object model to correct for multivalued, simple value attributes that were previously identified as their own semantic objects. Beginning at a step 490 in FIG. 10, the computer system analyzes each entry in the list of multivalued, simple value attributes. At a step 492, the container pointer of the simple value attribute is updated to be the address of the semantic object associated with the table referenced by the foreign key of the table. At a step 494, the computer system adds a pointer to the newly-added simple value attribute in the Contents list of the containing semantic object. The semantic object and its corresponding object link profile created for the multivalued, simple value attribute table are deleted from the semantic object model at step 496. At a step 498, the computer system determines whether all entries in the multivalued attribute list have been analyzed. If not, processing proceeds as indicated above until all improperly classified semantic objects are deleted and corresponding multivalued, simple value attributes are inserted into the proper semantic object.

Figure 10:
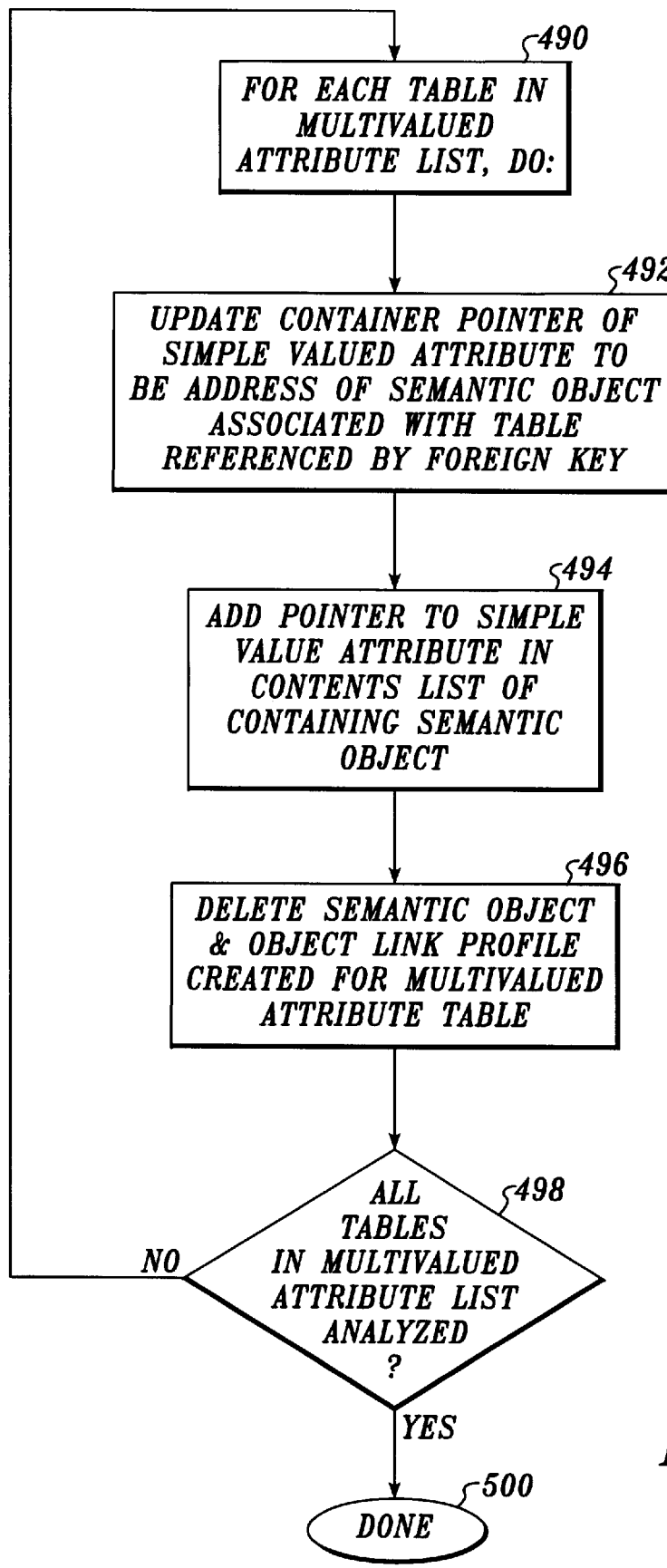
FIG. 10 is a flow chart showing the steps performed by the computer system to create a multivalued, simple value attribute within a semantic object to correspond to a table in a relational database schema.

To explain the logic of FIG. 10, reference is had to FIG. 1, as the semantic object model is initially created, the computer system will create a semantic object and corresponding object link profile for the table 9. However, because one artist may paint in many media, the simple value attribute, labeled "Medium," found in the semantic object that will be created for the table 9 should properly be placed in the semantic object that is created for table 7. Therefore, the logic operates to delete the semantic object and associated profile created for table 9 and place the simple value attribute labeled "Medium" within the semantic object 30.

As described above, the present invention operates to create a semantic object for each table in the database. Each column within a table is transformed into a corresponding simple value attribute as well as a corresponding simple value attribute profile. This will result in a profile created for each attribute within the semantic object model. However, many simple value attributes may be created from the same profile. For example, many of the attributes labeled "Name" may be created from a generic attribute profile called "identifier-text" that is predefined by the SALSA database modeling system. Therefore, the present invention allows the user to identify attributes that are derived from a common profile.

Figure 11:
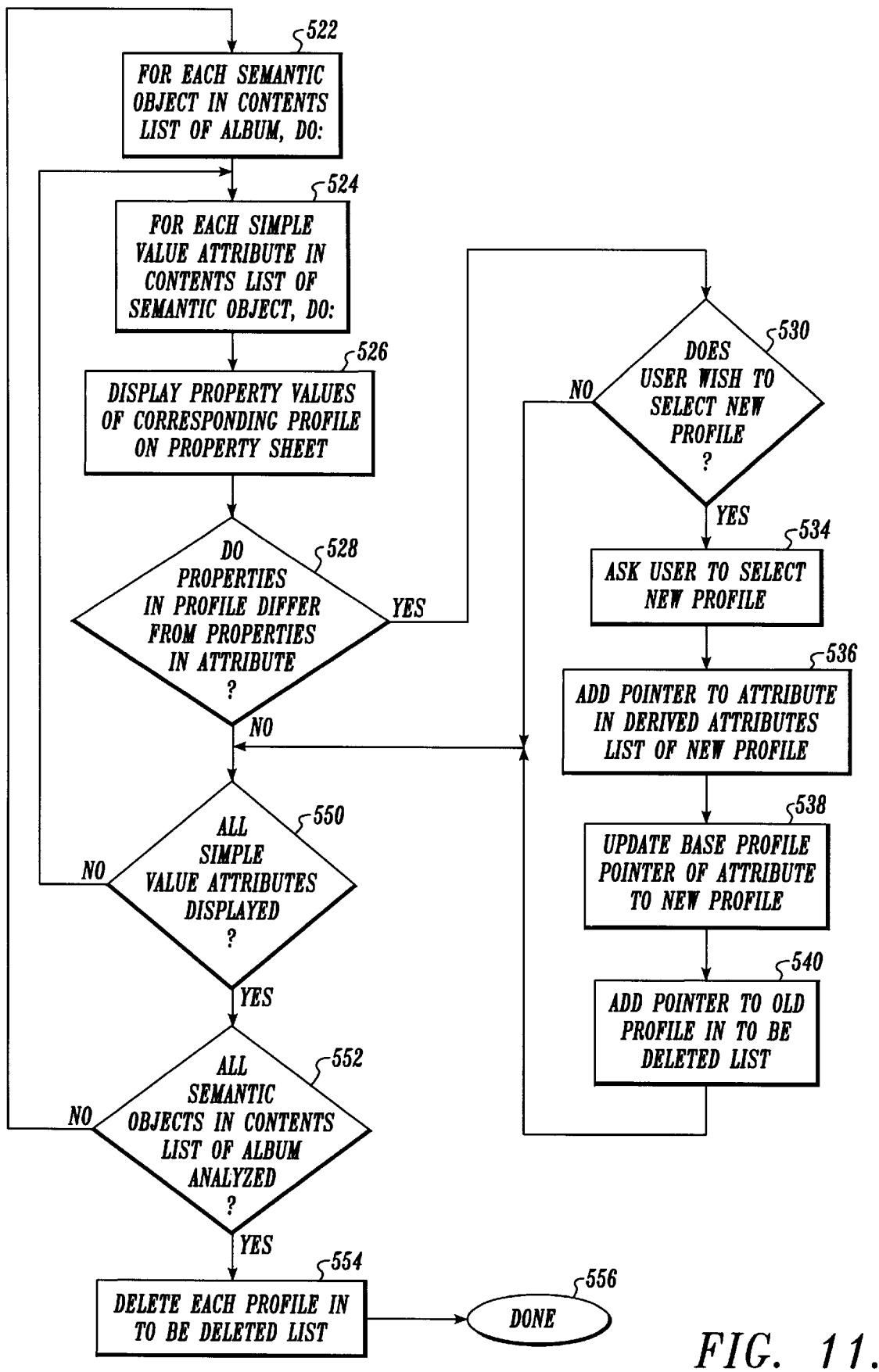
FIG. 11 is a flow chart of the steps performed by the computer system of the present invention to allow a user to select a profile associated with a simple value or group attribute within the semantic object model.

As shown in FIG. 11, common profiles are analyzed by beginning a loop at step 522 that analyzes each semantic object defined in the Contents list of the album. At a step 524, the computer system begins an inner loop that analyzes each simple value attribute within the Contents list of a given semantic object. At a step 526, the property values (i.e., values of its member variables) of the corresponding profile are displayed on the property sheet. The property sheet is a window (not shown) appearing on the graphical user interface that shows the name of the property and its corresponding value. At a step 528, the computer system determines whether the properties in the profile differ from the properties of the attribute. If so, the user is prompted at step 530 to indicate whether the user wishes to select a new profile for the corresponding attribute. If the user wishes to select a new profile, the user is asked to indicate which profile is associated with the attribute at a step 534. A pointer to the attribute is added to the Derived Attributes list of the selected profile at a step 536. The base profile pointer of the attribute is updated to equal the address of the newly selected profile at a step 538. Finally, a pointer to the old profile is added to a list of profiles to be deleted at a step 540.

If the answer to step 530 is no, meaning the user does not wish to select a new profile, processing proceeds to step 550 and the computer system determines whether the profiles for all simple value attributes in the semantic object under consideration have been analyzed. If not, processing loops back to step 524. If the profiles for all the simple value attributes in a semantic object have been analyzed, the computer system determines whether all semantic objects in the album have been analyzed. If not, processing returns to step 522 and the next semantic object in the album is analyzed.

Once all semantic objects in the album have been analyzed, the computer system then deletes each profile in the list of profiles to be deleted at a step 554 and processing ends at step 556.

The above discussion describes how a semantic object model is created from a database schema when the DBMS catalog provides relationship information. However, some database programs do not store this relationship information. Therefore, in order to create a semantic object model for these types of databases, it is necessary to prompt the user to indicate how various tables in the database are related. FIGS. 12A–12D show the steps performed by the present invention to create a corresponding semantic object model for databases that do not provide such relational information.

Beginning at a step 600, the computer system first performs the steps outlined in FIGS. 4A–4D. As indicated above, this will create a semantic object model that includes semantic objects for each table defined in the relational database catalog as well as simple value attributes for each column defined for a table.

At a step 602, the computer system provides a dialog box on the graphical user interface that allows a user to indicate two semantic objects that are related. At a step 604, the computer system prompts the user to indicate the maximum cardinality of both sides of the relationship. This relationship may be of the type one-to-one, one-to-many, many-to-one, or many-to-many.

At a step 606, the computer system determines whether the user indicated that the relationship was a many-to-many type. If so, the computer system then asks the user to identify the semantic object associated with the corresponding intersection table in the database at step 608. At a step 610, the computer system adds the relational database table associated with the semantic object identified to the list of intersection tables. Processing then proceeds to step 612, where the user can either quit or continue providing the relational information.

Figure 12A:
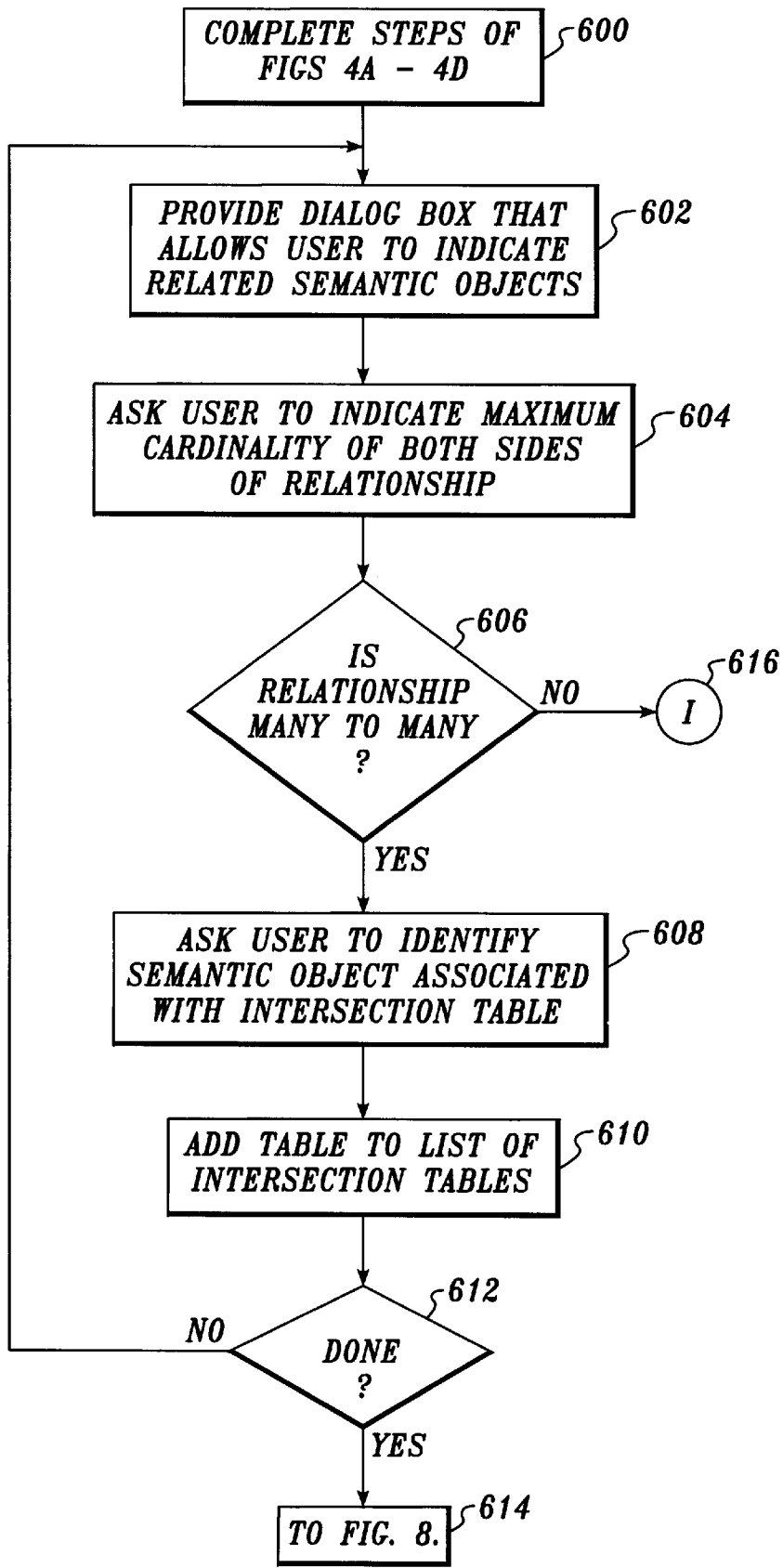
FIGS. 12A–12D are a series of flow charts showing the steps performed by the computer system of the present invention to create object link attributes, multivalued group attributes, and multivalued, simple value attributes in a semantic object model when the corresponding relational database catalog does not include relationship information.
Figure 12B:
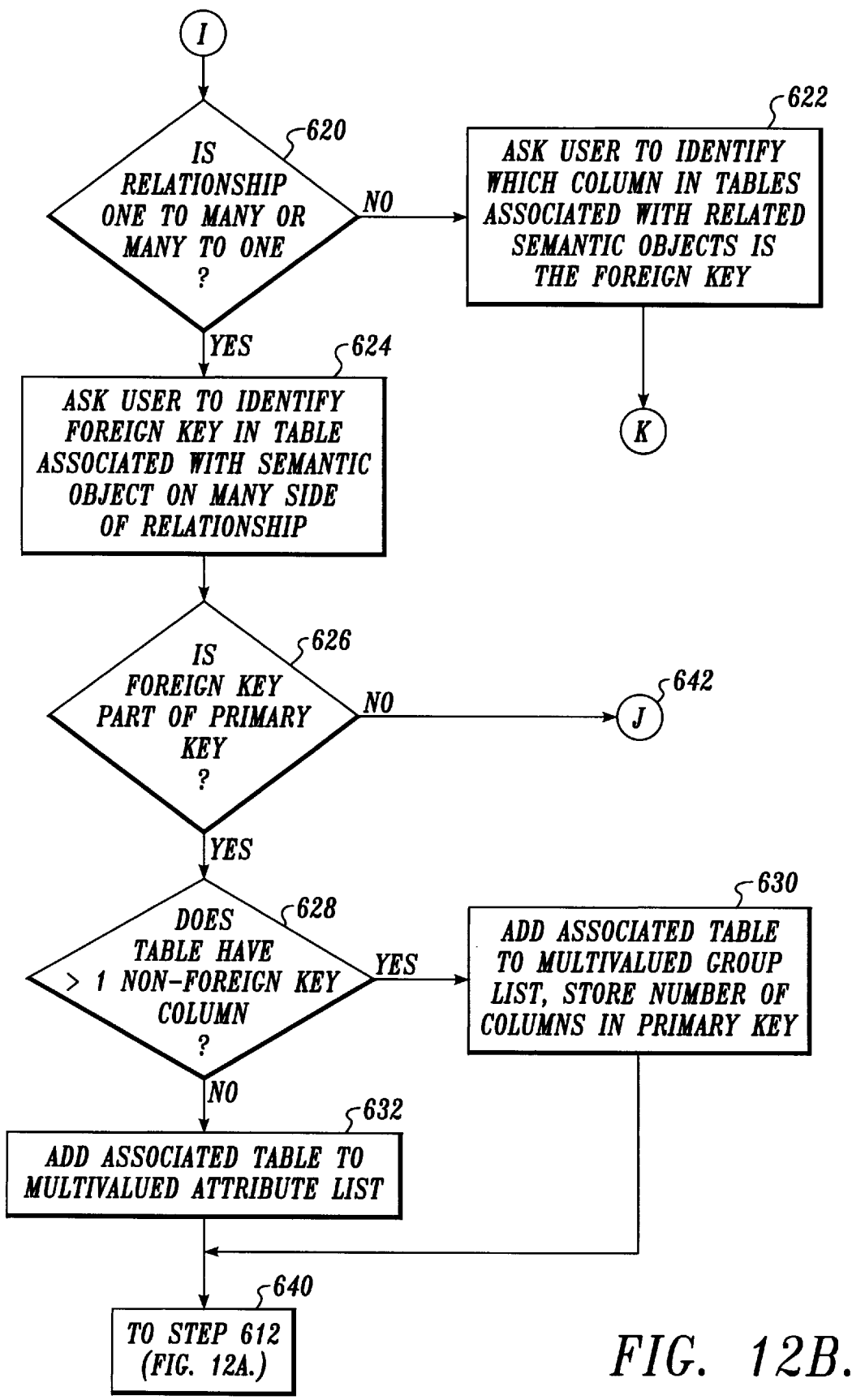
Figure 12C:
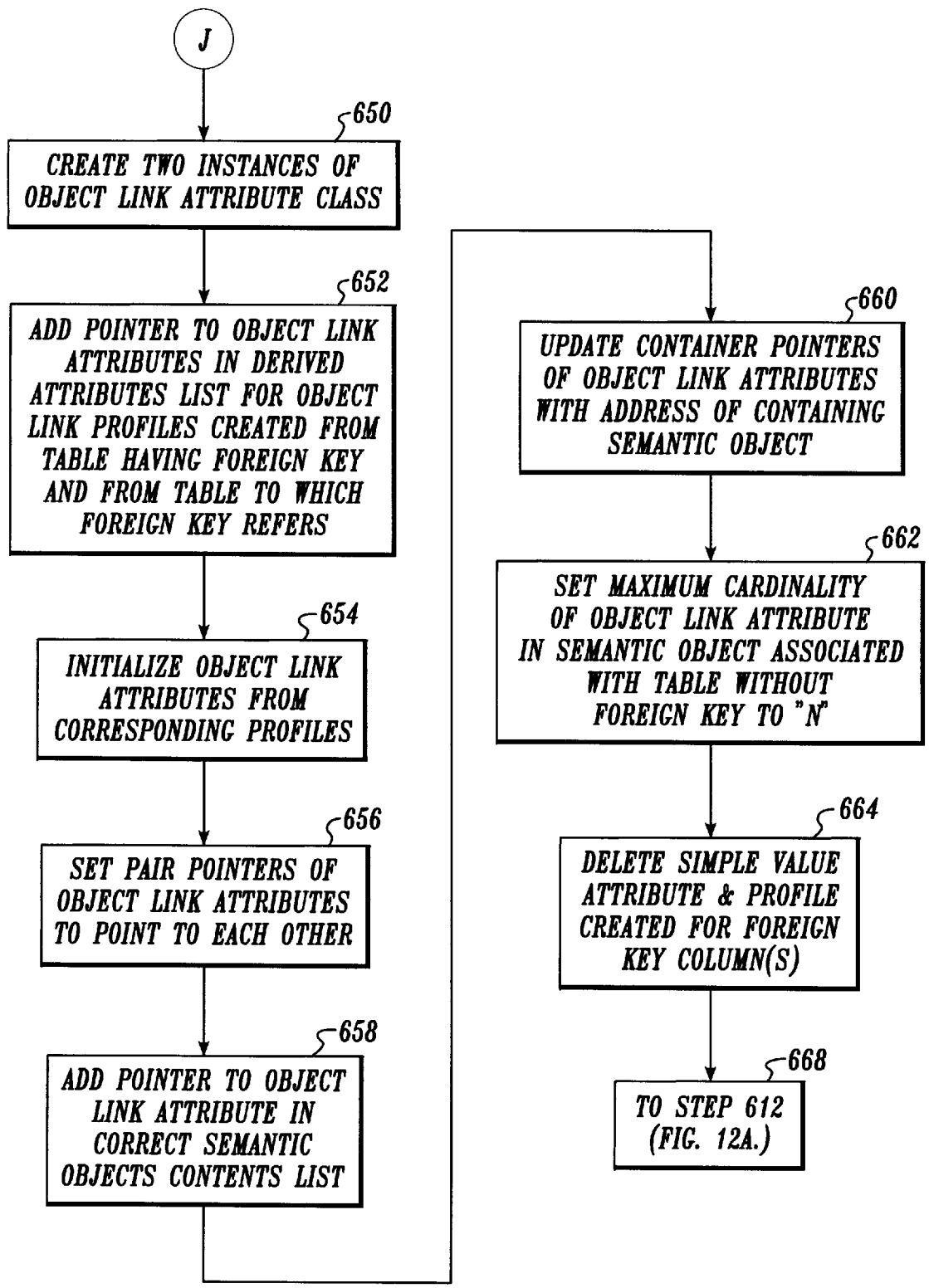
Figure 12D:
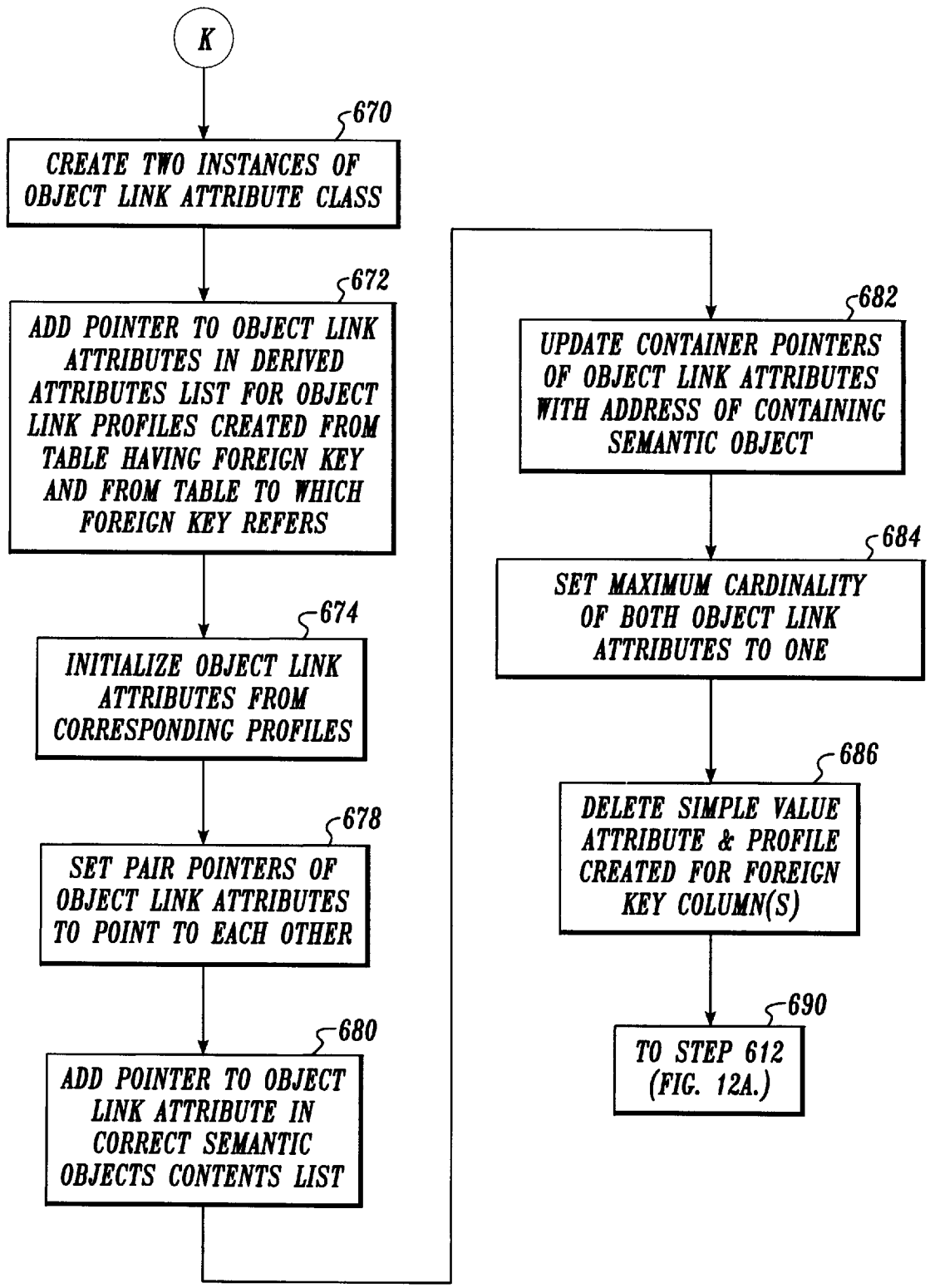

If the answer to decision step 606 is no, meaning that the relationship was not a many-to-many type, processing proceeds to step 620 shown in FIG. 12B. In step 620, the computer system determines whether the relationship indicated by the user is a one-to-many or many-to-one type. If so, the user is prompted to identify the foreign key in the table associated with the semantic object on the many side of the relationship at step 624. At a step 626, the computer system then determines whether the foreign key is part of the primary key of this table. If so, processing proceeds to step 628 and the computer system determines whether the table has more than one non-foreign key column. Tables having more than one non-foreign key column are added to the list of multivalued group tables at step 630. Additionally, the number of columns in the primary key of the multivalued group table are stored. If the answer to step 628 is no, the table is assumed to represent a multivalued, simple value attribute and is added to the multivalued, simple value attribute list at step 632. Processing then returns to step 612 in FIG. 12A.

If the answer to step 626 is no, then the computer system determines that the semantic objects must be related by a one-to-many object link attribute. Therefore, processing proceeds to step 650 shown in FIG. 12C, whereby two instances of the Object Link Attribute class are created. At a step 652, pointers to the object link attributes are added to the Derived Attributes list of the object link profiles associated with the table having the foreign key and with the table to which the foreign key refers. The object link attributes are initialized from the corresponding object link profiles at step 654.

At a step 656, the Pair pointers of the newly-created object link attributes are set to point to each other. At step 658, a pointer to the object link attribute is added to the correct semantic object's Contents list in the manner described above.

At a step 660, the Container pointer of each object link attribute is updated with the address of its containing semantic object. After updating the Container pointer, the Maximum Cardinality of the object link attribute in the semantic object associated with the table without the foreign key is set to "N."

At a step 664, the computer system then deletes the simple value attribute and profile that was created for the foreign key column(s) that is now represented by the object link attributes. Processing then returns to step 612 shown in FIG. 12A.

If the answer to step 620 in FIG. 12B was no, then the relationship is assumed to be represented by a one-to-one object link attribute. The user of the computer system is therefore asked to identify which column(s) in the tables associated with the related semantic objects is the foreign key at step 622. Processing then proceeds to the steps shown in FIG. 12D.

Beginning at a step 670, the computer system creates two instances of the Object Link Attribute class. At a step 672, pointers to the object link attributes are added to the Derived Attributes list of the object link profile associated with the relational table having the foreign key and the object link profile associated with the table to which the foreign key refers. At a step 674, the object link attributes are initialized from their corresponding profiles. The pair pointers of the object link attributes are then set to point to each other at step 678.

At a step 680, the computer system updates the semantic objects' Contents list with a pointer to the correct object link attribute in the manner described above. The Container pointers of the object link attributes are then updated with the address of their containing semantic object at a step 682.

At a step 684, the maximum cardinality of both object link attributes is set equal to one. After the maximum cardinalities have been initialized, the computer system then deletes the simple valued attribute and profile that were created for the foreign key column(s) and processing returns to step 612 shown in FIG. 12A.

As can be seen, the present invention operates to create a semantic object model from an existing relational database schema. The semantic object model allows the user to easily manipulate or modify an existing relational database without requiring the user to understand the underlying database management system or the database's query language.

While the preferred embodiment of the invention has been illustrated and described, it will be appreciated that various changes can be made therein without departing from the spirit and scope of the invention. It is therefore intended that the scope of the invention be determined solely from the following claims.

The embodiments of the invention in which an exclusive property or privilege is claimed are defined as follows:

1. A computer system for creating a semantic object model from an existing relational database schema, comprising:

a memory having a database catalog stored therein, wherein the database catalog defines a plurality of relational database tables included within the database schema and at least one column included within each of the relational database tables;

a display device for displaying the semantic object model to a user;

a central processing unit, coupled to the memory and to the display device, the central processing unit including a computer program that causes the central processing unit to perform the following functions:

a) to analyze the database catalog to determine each relational database table defined in the existing relational database schema;

b) to create a semantic object within the semantic object model that corresponds to at least one of the relational database tables defined in the relational database schema;

c) to analyze each column defined in the relational database schema for the relational database table corresponding to the semantic object created; and d) to create at least one simple value attribute within the semantic object created that corresponds to a column defined for the relational database table to which the semantic object corresponds.

2. The computer system of claim 1, wherein the database catalog includes relationship information that defines whether a column included in a table is a foreign key to a column included in another relational database table in the relational database schema, wherein the computer program further causes the central processing unit to:

a) analyze each column included within each relational database table to determine if each column is defined as a foreign key to another table in the relational database schema;

b) create a pair of object link attributes; and c) add one object link attribute to a semantic object associated with the table that includes the column defined as the foreign key and to add another object link attribute of the paired object link attributes to a semantic object associated with the other relational database table.

3. The computer system of claim 2, wherein the database catalog defines which column of a table is a primary key, wherein the computer program further causes the central processing unit to:

a) analyze each column included within each relational database table to determine if a column is defined as both a foreign key to another relational database table in the relational database schema and is a primary key of a relational database table;

b) determine whether the relational table having the column that is both a foreign key to another table and is a primary key includes more than two columns; and c) create a multivalued group attribute within a semantic object associated with the table to which the foreign key refers if the table having the column that is both a foreign key and a primary has more than two columns.

4. The computer system of claim 3, wherein the computer program further causes the central processing unit to:

a) analyze each column included in each relational database table to determine if a column is defined as both a foreign key to another relational database table in the relational database schema and is a primary key of the relational database table;

b) determine whether the relational table having the column that is both a foreign key to another table and is a primary key has two or fewer columns; and c) create a multivalued, simple value attribute in the semantic object associated with the table to which the foreign key refers if the table having the column that is both the foreign key and a primary key has two or fewer columns.

5. The computer system of claim 1, wherein the computer program further causes the central processing unit to:

a) create a semantic object for each relational database table defined in the existing relational database schema.

6. The computer system of claim 5, wherein the database catalog includes relationship information that defines whether a column included in a table is a foreign key to another relational database table in the relational database schema, the computer program further causing the central processing unit to:

a) analyze each table defined in the relational database schema to determine if the table only includes columns that are defined as foreign keys to a pair of tables defined in the relational database schema;

b) to create a pair of multivalued object link attributes in the semantic objects associated with the tables referenced by the foreign keys; and c) deleting from the semantic object model the semantic object created for the table only including columns defined as foreign keys.

7. A method of operating a computer system of the type including a central processing unit, a memory, a permanent storage mechanism and a display screen to produce a semantic object model that corresponds to an existing relational database schema stored on the permanent storage mechanism, comprising the steps of:

retrieving a database catalog that defines one or more relational database tables included in the existing relational database schema as well as one or more columns defined for each relational database table and placing the database catalog into the memory of the computer system;

analyzing the database catalog to determine each relational database table defined in the existing relational database schema;

allocating space in the memory to create a semantic object for each relational database table defined in the existing relational database schema;

analyzing the database catalog to determine each column included within each table in the existing relational database schema;

allocating space in the memory to create a simple value attribute for each column included within each relational database table;

lining each simple value attribute created for the columns included in a relational database table with the semantic object created for the relational database table; and displaying a visual representation of at least some of the semantic objects and simple value attributes created on the display screen.

8. The method of claim 7, wherein the database catalog includes relationship information that defines whether a column in a table is a foreign key to another table in the existing relational database schema and primary key information that defines which columns included in a relational table are defined as a primary key of the relational table, the method further comprising the steps of:

analyzing the catalog to determine whether a column included in a table is both a foreign key to another relational table in the existing relational database schema and is defined as a primary key of a relational database table;

analyzing the catalog to determine if a table having a column that is both a foreign key and a primary key includes more than one non-foreign key column;

allocating space in the memory to create a multivalued group attribute if a table has a column that is both a foreign key and a primary key; and linking the multivalued group to the semantic object created for the relational database table referenced by the foreign key.

9. The method of claim 8, further comprising the steps of:

allocating space in the memory to create a multivalued, simple value attribute if a table has a column that is defined as a foreign key and a primary key wherein the table has only one non-foreign key column; and linking the multivalued, simple value attribute to the semantic object created for the relational database table referenced by the foreign key.

10. The method of claim 9, further comprising the steps of:

analyzing the database catalog to determine if a table exists having only columns that are defined as foreign keys;

allocating space in the memory for a pair of multivalued object link attributes for each table having only columns defined as foreign keys; and lining the pair of multivalued, object link attributes to the relational database tables referenced by the foreign keys of the table.

11. The method of claim 10, further comprising the step of:

deleting from memory the space allocated for each semantic object created for a relational database table having only columns defined as foreign keys.

12. The method of claim 8, further comprising the step of:

deleting from memory the space allocated for each semantic object created for a relational database table having a column that is defined as a foreign key and a primary key and wherein the table includes more than two columns.

13. The method of claim 9, further comprising the step of:

deleting from memory the space allocated for each semantic object created for a relational database table having a column that is a foreign key and a primary key wherein the table has only two columns.

14. The method of claim 7, further comprising the steps of:

allocating space within the memory to store a list of each semantic object created; and adding a reference to the list each time a semantic object is created.

15. The method of claim 7, further comprising the step of:

allocating space in the memory to create an object link profile for each semantic object created.

16. The method of claim 7, wherein the database catalog provides information indicating the primary keys of a relational database table but does not provide relationship information, the method further comprising the steps of:

displaying a dialog box on the display screen that allows a user to indicate two semantic objects in the semantic object model that are related;

prompting the user to indicate whether the semantic objects are related through a one-to-one, one-to-many, many-to-one or many-to-many relationship; and recording the relationship information entered by the user.

17. The method of claim 16, further comprising the steps of:

determining whether the user indicated that the relationship between the related semantic objects was many-to-many;

prompting the user to indicate an intersection table in the existing relational database schema having columns that contain foreign keys to other relational tables in the existing relational database schema;

allocating space in the memory to create a pair of multivalued object link attributes; and linking each object link attribute of the pair of multivalued object link attributes to the semantic objects created for the relational database tables referenced by the foreign keys.

18. The method of claim 17, further comprising the steps of:

determining if the relationship is one-to-one and if so allocating space in the memory to create a pair of object link attributes; and linking each object link attribute of the pair of object link attributes to the semantic objects related by the one-to-one relationship.

19. The method of claim 16, further comprising the steps of:

determining whether the user indicated that the relationship between the related semantic objects was one-to-many or many-to-one;

determining a semantic object associated with a one side of the one-to-many relationship and a semantic object associated with a many side of the relationship;

prompting a user to indicate a relational table in the existing relational data that has a foreign key to a relational table associated with the semantic object on the one side of the relationship;

determining whether the table indicated has more than one non-foreign key column and whether the foreign key is part of the primary key of the table;

allocating space in the memory to create a multivalued group attribute if the table indicated has more than two columns and the foreign key was part of the primary key of the table;

allocating space in the memory to create a multivalued simple value attribute if the table indicated has only one non-foreign key column and the foreign key was part of the primary key of the table; and linking the multivalued group or multivalued simple value attribute to the semantic objects related by the one-to-many relationship.

20. A computer readable memory that can be used to direct a computer to function as defined in claim 7 when used by the computer.

\* \* \* \* \*